United States Patent
Zhang et al.

(10) Patent No.: US 11,380,881 B2
(45) Date of Patent: Jul. 5, 2022

(54) ANODE MATERIAL OF LITHIUM ION BATTERY AND NON-AQUEOUS ELECTROLYTE BATTERY

(71) Applicant: AAC Acoustic Technologies (Shenzhen) Co., Ltd., Shenzhen (CN)

(72) Inventors: Jian Zhang, Shenzhen (CN); Xiaoming Lou, Shenzhen (CN); Shaohai Chen, Saratoga, CA (US)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 247 days.

(21) Appl. No.: 16/596,777

(22) Filed: Oct. 9, 2019

(65) Prior Publication Data
US 2020/0112018 A1  Apr. 9, 2020

(30) Foreign Application Priority Data
Oct. 9, 2018  (CN) .......................... 201811172011.2

(51) Int. Cl.
| | |
|---|---|
| *H01M 4/131* | (2010.01) |
| *H01M 4/1391* | (2010.01) |
| *H01M 4/04* | (2006.01) |
| *H01M 4/525* | (2010.01) |
| *H01M 10/0525* | (2010.01) |
| *H01M 10/0565* | (2010.01) |
| *H01M 4/02* | (2006.01) |

(52) U.S. Cl.
CPC ......... *H01M 4/131* (2013.01); *H01M 4/0404* (2013.01); *H01M 4/1391* (2013.01); *H01M 4/525* (2013.01); *H01M 10/0525* (2013.01); *H01M 10/0565* (2013.01); *H01M 2004/027* (2013.01); *H01M 2004/028* (2013.01)

(58) Field of Classification Search
CPC ......... H01M 10/0525; H01M 10/0562; H01M 10/0565; H01M 2004/027; H01M 2004/028; H01M 4/0404; H01M 4/131; H01M 4/1391; H01M 4/485; H01M 4/525

See application file for complete search history.

(56) References Cited

PUBLICATIONS

X. Zhu, Q. Fu, L. Tang, C. Lin, J. Xu, G. Liang, R. Li, L. Luo, Y. Chen. Mg2Nb34O87 Porous Microspheres for Use in High-Energy, Safe, Fast-Charging, and Stable Lithium-Ion Batteries, ACS Appl. Mater. Interfaces 2018, 10, 23711-23720.*

P. Amonpattaratkit and S. Ananta. Effects of calcination temperature on phase formation and particle size of Zn2Nb34O87 powder synthesized by solid-state reaction, Materials Chemistry and Physics 139 (2013) 478-482.*

\* cited by examiner

*Primary Examiner* — Carlos Barcena
(74) *Attorney, Agent, or Firm* — W&G Law Group

(57) ABSTRACT

An anode material of a lithium-ion battery and a non-aqueous electrolyte lithium-ion battery are disclosed in the present invention. The anode material of a lithium-ion battery, wherein, a chemical formula of the anode material of the lithium-ion battery is $M_xNb_yO_z$, wherein, M is a bivalent non-niobium metal ion, and x,y,z satisfy the following conditions: $0<x\leq3$, $1\leq y\leq34$, and $3\leq z\leq87$.

7 Claims, 10 Drawing Sheets

ANODE MATERIAL OF LITHIUM ION BATTERY AND NON-AQUEOUS ELECTROLYTE BATTERY

The present disclosure relates to lithium ion battery field, more particularly to an anode material of lithium ion battery and a non-aqueous electrolyte battery.

DESCRIPTION OF RELATED ART

Lithium-ion batteries with high power density and energy density have been recognized as a promising energy source for electrical vehicles. Recently, the fast-growing market of electrical vehicles has led to increasing demands for the development of high performance lithium-ion batteries, and the key to improve the battery performance is to develop new electrode materials. At present, commercial lithium-ion batteries use graphite as an anode material and a liquid organic solution as an electrolyte. Graphite has the advantages of high theoretical capacity (372 mAh g$^{-1}$), long cycle life, low cost, etc. However, at high rate charging/discharging process, the battery could face short-circuiting, even worse burns due to the formation of lithium dendrite, because of the low operating potential of graphite anode. In addition, the low lithium ion diffusion coefficient of graphite hinders their application in high performance lithium ion batteries. Due to the small diffusion coefficient, high overpotential will be observed during the fast charging process with large current density, resulting in more negative potential of graphite anode, which will increase the tendency to generate lithium dendrites and introduce the safety issue. At the same time, under the condition of large current charging, the heat generated by the system is intensified, resulting in easier decomposition of the traditional liquid organic electrolyte. In Therefore, it has been an urgent need to develop an anode material having excellent electrochemical performance and high safety performance.

Among the anode materials which are promising to replace graphite, the "zero strain" $Li_4Ti_5O_{12}$ material has been extensively studied. The material has a safe working potential, good cycle performance, and after modification the $Li_4Ti_5O_{12}$ material can meet the requirements of fast charging, but its inherent low theoretical capacity (only 175 mAhg$^{-1}$) limits the application in high performance lithium ion batteries.

Under such conditions, the M-Nb—O anode material has attracted attention because of its high theoretical capacity and safe operating potential. Compared with the $Li_4Ti_5O_{12}$ material, the M-Nb—O material also has a safe working potential ($Nb^{3+}/Nb^{4+}$ and $Nb^{4+}/Nb^{5+}$), but since there are two electrons transfer between $Nb^{3+}$ and $Nb^{5+}$, the M-Nb—O material has a higher theoretical capacity. In addition, the M-Nb—O material has a more open spatial structure than the $Li_4Ti_5O_{12}$ structure, which is more conducive to the conduction of ions and electrons. Therefore, the M-Nb—O material has better electrochemical performance. However, only a small amount of M-Nb—O material has been used for non-aqueous electrolyte batteries so far. Therefore, exploring more M-Nb—O anode materials with good electrochemical properties is very helpful for the development of high performance non-aqueous electrolyte batteries.

DETAILED DESCRIPTION OF THE EXEMPLARY EXAMPLE

Figure 1:
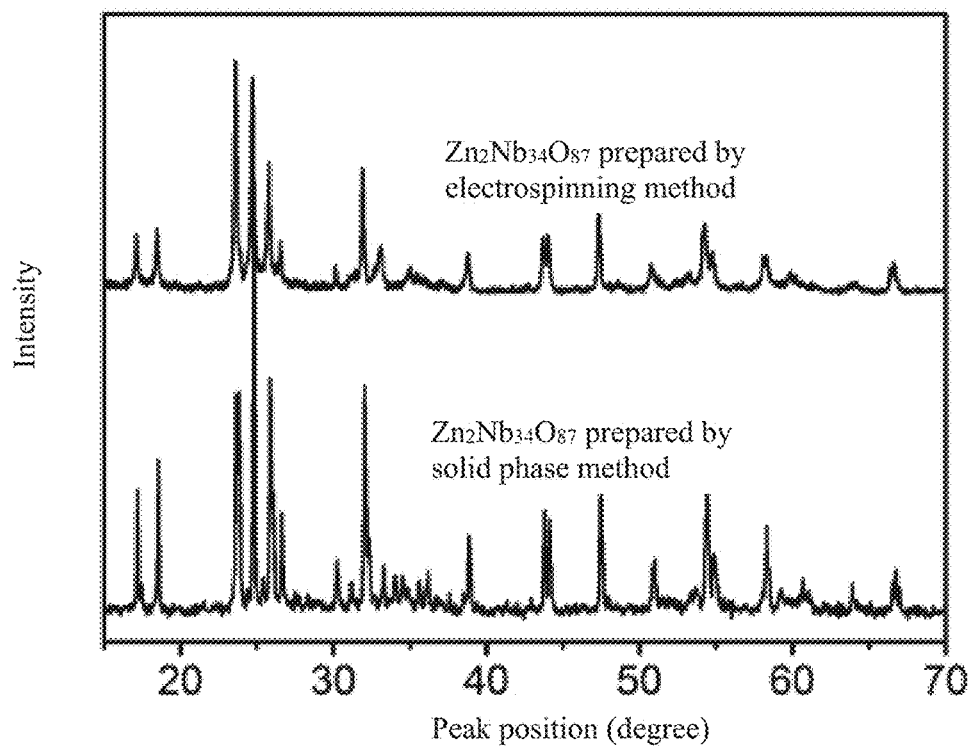
FIG. 1 shows X-ray diffraction patterns of $Zn_2Nb_{34}O_{87}$ produced in example 1 and example 43 of the present invention.

In order to clearly explain the object, technical solution and advantages of the present invention, the Examples will be described detailly in conjunction with the figures of the present invention. It is evident that the described examples are merely part of the examples of the present invention, rather than all of the examples. Basing on the examples of the present invention, all other examples obtained by a person of ordinary skill in the art without applying inventive activity are all within the scope of protection of the present invention.

Hereafter, the present disclosure will be further described with reference to the accompanying drawings and example. If there is no special definition for the raw material used in the preparing method, the raw material can be purchased from the market.

An anode material of a lithium-ion battery according to the present invention is disclosed. A chemical formula of the anode material of the lithium-ion battery is $M_xNb_yO_z$, wherein, M is a bivalent non-niobium metal ion, and x,y,z satisfy the following conditions: $0<x\leq3$, $1\leq y\leq34$, and $3\leq z\leq87$.

M may be one or more elements selected from Zn, Cu, Mg, Ni, Mn, Co, Ca, Fe, Sr, Sn, Pb, Ba and Hg.

$M_xNb_yO_z$ may be one or more compounds selected from $M_2Nb_{34}O_{87}$, $MNb_8O_{21}$, $M_{1/3}Nb_{74/3}O_{62}$, and $MNb_{20}O_{51}$.

$M_xNb_yO_z$ may be one or more compounds selected from $Zn_2Nb_{34}O_{87}$, $Cu_2Nb_{34}O_{87}$, $Mg_2Nb_{34}O_{87}$, $Ca_2Nb_{34}O_{87}$, $CuNb_8O_{21}$, $ZnNb_8O_{21}$, $MgNb_8O_{21}$, $CaNb_8O_{21}$, $Cu_{1/3}Nb_{74/3}O_{62}$, $Zn_{1/3}Nb_{74/3}O_{62}$, $Mg_{1/3}Nb_{74/3}O_{62}$, $Ca_{1/3}Nb_{74/3}O_{62}$, $CuNb_2O_{51}$, $ZnNb_{20}O_{51}$, $MgNb_2O_{51}$, $CaNb_2O_{51}$.

The anode material has a single pure-phase structure, and the crystal structure thereof is a shearing $ReO_3$ structure.

Compared with traditional graphite anode, the $M_xNb_yO_z$ anode material of lithium-ion battery has high theoretical specific capacity, high safety, high reversible specific capacity, high coulomb efficiency, and excellent cycle performance, and so on. The $M_xNb_yO_z$ anode material can improve the charge rate performance of the lithium-ion battery, and can solve many problems occurred while charging the lithium battery using liquid electrolyte and graphite anode material, such as unstable liquid electrolyte, many lithium dendrites. Especially, the anode material $M_xNb_yO_z$ can be used as a new electrode material of non-aqueous electrolyte battery to solve the matter that prevent high performance non-aqueous electrolyte battery from developing due to lack of M-Nb—O material. For example, the M-Nb—O is applied into the solid lithium ion battery, since the $M_xNb_yO_z$ material has low charge-discharge expansion ratio, reduced interface impedance, the electrochemical performance thereof applied into the lithium battery is enhanced.

The present invention provides several methods for manufacturing the $M_xNb_yO_z$ anode material, comprising a solid phase method, a electrospinning method, and a template-directed method.

The solid phase method comprises the following steps: mixing a metal M source and a niobium source at a molar ratio of M:Nb=x:y, and then milling the mixture by high energy ball milling and sintering it at high temperature to obtain $M_xNb_yO_z$ powder. The sintering temperature is ranged from 1100° C. to 1400° C., the sintering time is ranged from 3 h to 5 h.

Preferably, the metal M source comprise M oxide and/or M salt. The M salt comprises M acetylacetone and/or M acetate. The niobium source may be one or type of niobium pentoxide, niobium powder, niobium oxalate, niobium ethoxide.

The electrospinning method comprise the following steps:

Step 1: adding metal M source, anti-hydrolysis agent, binder into an organic solvent to form a M precursor solution;

Step 2: dissolving the niobium source into the organic solvent to form a niobium precursor solution;

Step 3: mixing the M precursor solution and niobium precursor solution at the molar ratio of M:Nb=x:y, and then obtaining a fiber by electrospinning;

Step 4: drying and sintering the fiber to obtain $M_xNb_yO_z$ powder.

Preferably, the metal M source comprise M oxide and/or M salt. The M salt comprises M acetylacetone and/or M acetate. The niobium source may be one or type of niobium pentoxide, niobium powder, niobium oxalate, niobium ethoxide; the anti-hydrolysis agent comprises acetic acid and/or citric acid; the binder comprises polyvinylpyrrolidone or/and polyacrylonitrile; the organic solvent comprises N, N-dimethylformamide or/and ethanol.

Preferably, the condition for electrospinning comprises: the diameter of the needle is 22 G, the capacity of the needle injector is 15 ml, push speed is 1 ml/h, the voltage is 18 KV.

Preferably, in step 4, the dry temperature is 80° C., the sintering temperature is ranged from 850° C. to 1400° C., the sintering time is ranged from 3 h to 5 h.

The template-directed method comprises the following steps: mixing the metal M source and niobium source at molar ratio of M:Nb=x:y, and then dissolving them into the organic solvent to form a M/Nb mixture solution; immersing polystyrene template into the mixture solution for 12 h; then taking out the polystyrene template, and drying, sintering to obtain $M_xNb_yO_z$ powder.

Preferably, the metal M source comprise M oxide and/or M salt. The M salt comprises M acetylacetone and/or M acetate. The niobium source may be one or type of niobium pentoxide, niobium powder, niobium oxalate, niobium ethoxide. The organic solvent comprises N, N-dimethylformamide or/and ethanol.

The drying temperature is 80° C., the sintering temperature is ranged from 800° C. to 1300° C., sintering time is ranged from 3 h to 5 h.

The polystyrene template can be manufactured by the following steps, but not limited to this, preparing monodispersed polystyrene emulsion by soap-free emulsion method; preparing a colloidal crystal template using the monodispersed polystyrene emulsion by evaporation self-assembly method at 60° C.

A non-aqueous electrolyte lithium-ion battery is provided in the present invention. The battery comprises a positive electrode material, non-aqueous electrolyte, and an anode material as above mentioned.

The non-aqueous electrolyte lithium-ion battery comprises a liquid state non-aqueous electrolyte lithium-ion battery, a gel state non-aqueous electrolyte lithium-ion battery, and/or a solid state non-aqueous electrolyte lithium-ion battery.

The battery may comprises an anode, a positive electrode, a non-aqueous electrolyte, a diaphragm, and a package. The anode comprises current collector, anode material, electric conductive agent and binder; the current collector includes copper, nickel, stainless steel, aluminum, or an aluminum alloy containing another metal. The anode material is at least one compound selected from $M_xNb_yO_z$ material, graphite, lithium metal and lithium titanate. The electric conductive agent is at least one compound selected from carbon black, graphite, and acetylene black. The binder is at least one compound selected from polytetrafluoroethylene, polyvinylidene fluoride, fluorine-based rubber. In the anode of the non-aqueous electrolyte battery, the mass weight percent of anode material is more than 65%, and the mass weight percent of electric conductive agent is more than 2%.

The positive electrode comprises a current collector, a positive electrode material, electric conductive agent and binder. The current collector comprises aluminum, or an aluminum alloy containing another metal. The positive electrode material is one or more compound selected from oxide, sulfide and polymer. Specifically, the oxide comprise one or more type of Li—Mn-oxide (such as $Li_xMn_2O_4$), Li—Ni-oxide (such as $LiNi_2O_4$), Li—Co-oxide (such as $Li_aCoO_2$), Li—Ni—Co-Oxide (such as $LiNi_{1-b}CO_bO_2$), Li—Mn—Ni-oxide (such as $LiMn_{2-b}Ni_bO_2$, $LiMn_{2-b}Ni_bO_4$), Li—Mn—Co-oxide (such as $Li_aMn_bCO_{1-b}O_2$), Li-phosphorylation (such as $Li_aFePO_4$, $Li_aMPO_4$, $Li_2MPO_4F$) and Li—Ni—Co—Mn-oxide. In the chemical formula of the oxide, a, b satisfy the following conditions: $0 \le a \le 1$, $0 \le b \le 1$. The sulfide comprises iron sulfation (such as $Fe_2(SO_4)_3$). The polymer comprises at least one of polyaniline, polypyrole, and disulfide-based polymer. The electric conductive agent comprises at least one of carbon black, graphite, and acetylene black. The binder is at least one compound selected from polytetrafluoroethylene, polyvinylidene fluoride, fluorine-based rubber. In the positive electrode of the non-aqueous electrolyte battery, the mass weight percent of positive electrode material is more than 65%, and the mass weight percent of electric conductive agent is more than 2%.

The non-aqueous electrolyte of the non-aqueous electrolyte battery comprises one or more type of a liquid state non-aqueous electrolyte, a gel state non-aqueous electrolyte, and a solid state non-aqueous electrolyte. The liquid state non-aqueous electrolyte is prepared by dissolving the electrolyte into the organic solvent. The gel state non-aqueous electrolyte is prepared by forming the liquid state electrolyte and polymer complex. Specifically, the electrolyte comprises lithium salt and their mixture, which comprises lithium perchlorate, lithium perchlorate, lithium tetrafluoroborate, lithium hexafluoroarsenate, lithium trifluoromethanesulfonate, bistrifluoromethanesulfonimide lithium salt. The organic solvent comprises cyclic carbonate, linear carbonate, cycle ethers, linear ethers, acetonitrile, sulfolane. The cyclic carbonate comprises diethyl carbonate, dimethyl carbonate, or Dimethyl ethyl carbonate. The cycle ethers comprises tetrahydrofuran, 2-Methyltetrahydrofuran, or 1,4-dioxane. The linear ethers comprises Dimethylethane or diethoxyethane.

The solid state non-aqueous electrolyte comprises a sulfide based solid state non-aqueous electrolyte, an oxide-based solid state non-aqueous electrolyte, and conductive polymer non-aqueous electrolyte. The sulfide based solid state non-aqueous electrolyte comprises a binary sulfide, such as $Li_2S$—$P_2S_5$, $Li_2S$—$SiS_2$, $Li_2S$—$GeS_2$, $Li_2S$—$B_2S_3$, a ternary sulfide, such as $Li_2S$-$MeS_2$—$P_2S_5$(Me=Si, Ge, Sn, Al etc.), or halogen doped binary sulfide, such as $Li_2S$-A (A=$P_2S_5$, $SiS_2$, $GeS_2$, $P_2S_5$, $B_2S_3$ or $Al_2S_4$ etc.), a halogen doped ternary sulfide, such as $Li_2S$-$MeS_2$—$P_2S_5$(Me=Si, Ge, Sn, Al etc.). Halogen is one or more element selected from Cl, Br and I. Preferably, $Li_{9.54}Si_{1.74}P_{1.44}S_{11.7}C_{10.3}$. The oxide-based solid state non-aqueous electrolyte are crystalline and amorphous. The crystalline oxide-based solid state non-aqueous is electrolyte comprises perovskite type, NASICON type, LISICON type, garnet type, preferably, garnet type $Li_{6.5}La_3Zr_{1.75}Te_{0.25}O_{12}$ electrolyte. The amorphous electrolyte comprises LiPON electrolyte. The conductive polymer solid state electrolyte comprises polyethylene oxide, polyacrylonitrile, vinylidene fluoride, polymethyl methacrylate, poly[oxy(methyl-1,2-ethanediyl)], polyvinylidene chloride, or single ion polymer.

The diaphragm comprises porous membrane, which is consisting of polyethylene, polypropylene, cellulose, or polyvinylidene fluoride.

A method for manufacturing the solid state non-aqueous electrolyte lithium-ion battery comprises the following steps:

dissolving a solid state non-aqueous electrolyte into an organic solvent to obtain a gel liquid;

mixing a positive electrode material, an electric conductive agent, and the gel liquid uniformly to form a mixture, and then, coating the mixture onto a positive current collector, and then soliding to obtain a positive electrode plate;

mixing a negative electrode material, the electric conductive agent, and the gel liquid uniformly to form a mixture, and then, coating the mixture onto a negative current collector, and then soliding to obtain a negative solid material;

balling the solid state non-aqueous electrolyte, and then dissolving the balled solid state non-aqueous electrolyte into the organic solvent to obtain a slurry, coating the slurry on the negative solid material to form a dielectric layer, and then soliding to obtain a negative electrode plate;

assembling the positive electrode plate and the negative electrode plate by laminating technology, to prepare the solid state non-aqueous electrolyte lithium-ion battery.

Preferably, a soliding temperature for the positive electrode plate is ranged from 60° C. to 150° C., and the time is ranged from 2 h to 11 h; the soliding temperature for the negative solid material and the negative electrode plate is ranged from 70° C. to 160° C., and the time is ranged from 70 s to 350 s.

Preferably, 65%~85% by mass weight of the positive electrode material, 2%~5% by mass weight of the electric conductive agent, 10%~33% by mass weight of the solid non-aqueous electrolyte, based on a total mass weight of the positive electrode plate; 65%~85% by mass weight of the negative electrode material, 2%~5% by mass weight of the electric conductive agent, 10%~33% by mass weight of the solid non-aqueous electrolyte, based on a total mass weight of the negative electrode plate.

The laminating technology is operated at room temperature, and a pressure applied onto laminating plates is ranged from 300 MPa to 600 MPa.

The package may be cylinder shape, square shape, and button shape. The shape can be designed depending on the actual requirements so that it can be used in mobile device or electric vehicle.

Existing anode materials of solid state lithium-ion battery mostly use metal lithium and lithium titanate, the expansion ratio of charge-discharge volume of metal lithium is large, and the theoretical capacity of lithium titanate is low. The present invention firstly applies an $M_xNb_yO_z$ material as a negative electrode material to a non-aqueous electrolyte lithium. In ion batteries, especially solid state lithium-ion batteries, the cycle stability of the battery is obviously improved, and the pressure is high under charging at higher current, by the characteristics that the solid electrolytes is stabilized and are not easily decomposed, etc. Further, the preparation method for manufacturing non-aqueous electrolyte lithium battery provided by the present invention is simple in process, convenient in operation, low in production cost, and easy for large-scale industrial production.

Examples 1 through 42 provide a method for preparing $M_xNb_yO_z$ electrode material by solid phase method. The method is described detailed as following:

Example 1

Example 1 provides a method for preparing $Zn_2Nb_{34}O_{87}$ electrode material by solid phase method, comprising the following steps:

Mixing a zinc oxide and a niobium pentoxide according to elements molar ratio of 1:17 by high energy ball milling; sintering the mixture at 1200° C. for 4 h to obtain $Zn_2Nb_{34}O_{87}$ powder.

Example 2

Example 2 provides a method for preparing $Cu_2Nb_{34}O_{87}$ electrode material by solid phase method, comprising the following steps:

Mixing a copper oxide and a niobium pentoxide according to elements molar ratio of 1:17 by high energy ball milling; sintering the mixture at 1100° C. for 4 h to obtain $Cu_2Nb_{34}O_{87}$ powder.

Example 3

Example 3 provides a method for preparing $MgNb_2O_{51}$ electrode material by solid phase method, comprising the following steps:

Mixing a magnesium oxide and a niobium pentoxide according to elements molar ratio of 1:20 by high energy ball milling; sintering the mixture at 1200° C. for 4 h to obtain $MgNb_2O_{51}$ powder.

Example 4

Example 4 provides a method for preparing $CaNb_2O_{51}$ electrode material by solid phase method, comprising the following steps:

Mixing a calcium oxide and a niobium pentoxide according to elements molar ratio of 1:20 by high energy ball milling; sintering the mixture at 1200° C. for 4 h to obtain $CaNb_2O_{51}$ powder.

Example 5

Example 5 provides a method for preparing $Mg_{1/3}Nb_{74/3}O_{62}$ electrode material by solid phase method, comprising the following steps:

Mixing a magnesium oxide and a niobium pentoxide according to elements molar ratio of 1:74 by high energy ball milling; sintering the mixture at 1200° C. for 4 h to obtain $Mg_{1/3}Nb_{74/3}O_{62}$ powder.

Example 6

Example 6 provides a method for preparing $Cu_{1/3}Nb_{74/3}O_{62}$ electrode material by solid phase method, comprising the following steps:

Mixing a copper oxide and a niobium pentoxide according to elements molar ratio of 1:74 by high energy ball milling; sintering the mixture at 1200° C. for 4 h to obtain $Mg_{1/3}Nb_{74/3}O_{62}$ powder.

Examples 7-42 of the present invention provide methods for preparing $M_xNb_yO_z$ electrode material by solid phase method with M source and niobium source. Table 1 shows M source and niobium source, mixing ratio, sintering temperature, sintering time and final products of examples 7-42.

TABLE 1

| Example number | Elements molar ratio | M source | Niobium source | Sintering temperature (° C.) | Sintering time (h) | Final product |
|---|---|---|---|---|---|---|
| 7 | Zn:Nb = 1:17 | zinc oxide | niobium pentoxide | 1200 | 5 | $Zn_2Nb_{34}O_{87}$ |
| 8 | Zn:Nb = 1:17 | zinc oxide | niobium oxalate | 1300 | 4 | $Zn_2Nb_{34}O_{87}$ |
| 9 | Zn:Nb = 1:17 | zinc oxide | niobium powder | 1400 | 3 | $Zn_2Nb_{34}O_{87}$ |
| 10 | Zn:Nb = 1:17 | zinc acetylacetone | niobium pentoxide | 1300 | 4 | $Zn_2Nb_{34}O_{87}$ |
| 11 | Zn:Nb = 1:17 | zinc acetylacetone | niobium oxalate | 1400 | 5 | $Zn_2Nb_{34}O_{87}$ |
| 12 | Zn:Nb = 1:17 | zinc acetylacetone | niobium powder | 1200 | 3 | $Zn_2Nb_{34}O_{87}$ |
| 13 | Cu:Nb = 1:17 | copper oxide | niobium pentoxide | 1300 | 3 | $Cu_2Nb_{34}O_{87}$ |
| 14 | Cu:Nb = 1:17 | copper oxide | niobium oxalate | 1100 | 5 | $Cu_2Nb_{34}O_{87}$ |
| 15 | Cu:Nb = 1:17 | copper oxide | niobium powder | 1200 | 4 | $Cu_2Nb_{34}O_{87}$ |
| 16 | Cu:Nb = 1:17 | copper acetylacetone | niobium pentoxide | 1300 | 4 | $Cu_2Nb_{34}O_{87}$ |
| 17 | Cu:Nb = 1:17 | copper acetylacetone | niobium oxalate | 1100 | 3 | $Cu_2Nb_{34}O_{87}$ |
| 18 | Cu:Nb = 1:17 | copper acetylacetone | niobium powder | 1200 | 5 | $Cu_2Nb_{34}O_{87}$ |
| 19 | Mg:Nb = 1:20 | magnesium oxide | niobium pentoxide | 1200 | 5 | $MgNb_{20}O_{51}$ |
| 20 | Mg:Nb = 1:20 | magnesium oxide | niobium oxalate | 1300 | 4 | $MgNb_{20}O_{51}$ |
| 21 | Mg:Nb = 1:20 | magnesium oxide | niobium powder | 1400 | 3 | $MgNb_{20}O_{51}$ |
| 22 | Mg:Nb = 1:20 | magnesium acetylacetone | niobium pentoxide | 1300 | 4 | $MgNb_{20}O_{51}$ |
| 23 | Mg:Nb = 1:20 | magnesium acetylacetone | niobium oxalate | 1400 | 4 | $MgNb_{20}O_{51}$ |
| 24 | Mg:Nb = 1:20 | magnesium acetylacetone | niobium powder | 1200 | 3 | $MgNb_{20}O_{51}$ |
| 25 | Ca:Nb = 1:20 | calcium oxide | niobium pentoxide | 1200 | 5 | $CaNb_{20}O_{51}$ |

TABLE 1-continued

| Example number | Elements molar ratio | M source | Niobium source | Sintering temperature (° C.) | Sintering time (h) | Final product |
|---|---|---|---|---|---|---|
| 26 | Ca:Nb = 1:20 | calcium oxide | niobium oxalate | 1300 | 4 | $CaNb_{20}O_{51}$ |
| 27 | Ca:Nb = 1:20 | calcium oxide | niobium powder | 1400 | 3 | $CaNb_{20}O_{51}$ |
| 28 | Ca:Nb = 1:20 | calcium acetylacetone | niobium pentoxide | 1300 | 4 | $CaNb_{20}O_{51}$ |
| 29 | Ca:Nb = 1:20 | calcium acetylacetone | niobium oxalate | 1400 | 5 | $CaNb_{20}O_{51}$ |
| 30 | Ca:Nb = 1:20 | calcium acetylacetone | niobium powder | 1200 | 3 | $CaNb_{20}O_{51}$ |
| 31 | Mg:Nb = 1:74 | magnesium oxide | niobium pentoxide | 1200 | 5 | $Mg_{1/3}Nb_{74/3}O_{62}$ |
| 32 | Mg:Nb = 1:74 | magnesium oxide | niobium oxalate | 1300 | 4 | $Mg_{1/3}Nb_{74/3}O_{62}$ |
| 33 | Mg:Nb = 1:74 | magnesium oxide | niobium powder | 1400 | 3 | $Mg_{1/3}Nb_{74/3}O_{62}$ |
| 34 | Mg:Nb = 1:74 | magnesium acetylacetone | niobium pentoxide | 1300 | 4 | $Mg_{1/3}Nb_{74/3}O_{62}$ |
| 35 | Mg:Nb = 1:74 | magnesium acetylacetone | niobium oxalate | 1400 | 5 | $Mg_{1/3}Nb_{74/3}O_{62}$ |
| 36 | Mg:Nb = 1:74 | magnesium acetylacetone | niobium powder | 1200 | 3 | $Mg_{1/3}Nb_{74/3}O_{62}$ |
| 37 | Cu:Nb = 1:74 | copper oxide | niobium pentoxide | 1200 | 5 | $Cu_{1/3}Nb_{74/3}O_{62}$ |
| 38 | Cu:Nb = 1:74 | copper oxide | niobium oxalate | 1300 | 4 | $Cu_{1/3}Nb_{74/3}O_{62}$ |
| 39 | Cu:Nb = 1:74 | copper oxide | niobium powder | 1400 | 3 | $Cu_{1/3}Nb_{74/3}O_{62}$ |
| 40 | Cu:Nb = 1:74 | copper acetylacetone | niobium pentoxide | 1300 | 4 | $Cu_{1/3}Nb_{74/3}O_{62}$ |
| 41 | Cu:Nb = 1:74 | copper acetylacetone | niobium oxalate | 1400 | 5 | $Cu_{1/3}Nb_{74/3}O_{62}$ |
| 42 | Cu:Nb = 1:74 | copper acetylacetone | niobium powder | 1200 | 3 | $Cu_{1/3}Nb_{74/3}O_{62}$ |

Examples 43-59 provide methods for preparing $M_xNb_yO_z$ electrode material by electrospinning method. The methods are described detailed as following:

Example 43

This example provides a method for preparing $Zn_2Nb_{34}O_{87}$ electrode material by electrospinning method, comprising the following steps:

S11: dissolving 0.001 mol zinc acetylacetonate, 2 ml acetic acid, 1 g polyvinylpyrrolidone into 10 ml N,N-dimethylformamide to producing a zinc solution;

S12: dissolving 0.017 mol niobium ethoxide into 5 ml ethanol to producing a niobium solution;

S13: mixing the zinc solution and the niobium solution uniformly, and then obtaining a fiber by electrospinning method; a diameter of a needle is 22 G, a capacity of a syringe is 15 ml; a distance between the needle and a collector is 15 cm, a push speed of needle injector is 1 mL/h at a voltage of 18 kV, drying the fiber at 80° C. after spinning.

S14: sintering the precursor fiber at 850° C. for 1 h to obtain $Zn_2Nb_{34}O_{87}$ powder.

Example 44

This example provides a method for preparing $MgNb_2O_{51}$ electrode material by electrospinning, comprises the following steps:

S11: dissolving 0.001 mol magnesium acetylacetonate, 2 ml acetic acid, 1 g polyvinylpyrrolidone into 10 ml N,N-dimethylformamide to producing a magnesium solution;

S12: dissolving 0.017 mol niobium ethoxide into 5 ml ethanol to producing a niobium solution;

S13: mixing the magnesium solution and the niobium solution uniformly, and then obtaining a fiber by electrospinning; a diameter of a needle is 22 G, a capacity of a syringe is 15 ml; a distance between the needle and a collecting plate is 15 cm, a push speed of needle injector is 1 mL/h at a voltage of 18 kV, drying the fiber at 80° C. after spinning.

S14: sintering the precursor fiber at 850° C. for 1 h to obtain $MgNb_{20}O_{51}$ powder.

The present invention further provided examples 45-59 which provide methods for preparing $M_xNb_yO_z$ electrode material by electrospinning with M source and niobium source. Table 2 shows M source, niobium source, anti-hydrolysis agent, adhesive, organic solvent, and mixing ration of the anti-hydrolysis agent, adhesive, organic solvent, sintering time, sintering temperature, and a final product of examples 45-59.

TABLE 2

| Examples number | Elements molar ratio | M source (M = Zn, Mg) | Niobium source | anti-hydrolysis agent | adhesive | organic solvent | sintering temperature (° C.) | sintering time (h) | final product |
|---|---|---|---|---|---|---|---|---|---|
| 45 | Zn:Nb = 1:17 | zinc acetylacetonate | niobium ethoxide | acetic acid | polyacrylonitrile | n,n-dimethylformamide | 900 | 5 | $Zn_2Nb_{34}O_{87}$ |
| 46 | Zn:Nb = 1:17 | zinc acetylacetonate | niobium ethoxide | citric acid | polyvinylpyrrolidone | ethanol | 850 | 4 | $Zn_2Nb_{34}O_{87}$ |
| 47 | Zn:Nb = 1:17 | zinc acetylacetonate | niobium ethoxide | citric acid | polyacrylonitrile | n,n-dimethylformamide | 900 | 5 | $Zn_2Nb_{34}O_{87}$ |
| 48 | Zn:Nb = 1:17 | Zinc acetylacetonate | niobium oxalate | acetic acid | polyvinylpyrrolidone | ethanol | 950 | 5 | $Zn_2Nb_{34}O_{87}$ |
| 49 | Zn:Nb = 1:17 | Zinc acetylacetonate | niobium oxalate | acetic acid | polyacrylonitrile | n,n-dimethylformamide | 900 | 4 | $Zn_2Nb_{34}O_{87}$ |
| 50 | Zn:Nb = 1:17 | Zinc acetylacetonate | niobium oxalate | citric acid | polyvinylpyrrolidone | ethanol | 900 | 5 | $Zn_2Nb_{34}O_{87}$ |
| 51 | Zn:Nb = 1:17 | Zinc acetylacetonate | niobium oxalate | citric acid | polyacrylonitrile | n,n-dimethylformamide | 950 | 4 | $Zn_2Nb_{34}O_{87}$ |
| 52 | Mg:Nb = 1:20 | magnesium acetylacetonate | niobium ethoxide | acetic acid | polyvinylpyrrolidone | ethanol | 850 | 4 | $MgNb_{20}O_{51}$ |
| 53 | Mg:Nb = 1:20 | magnesium acetylacetonate | niobium ethoxide | acetic acid | polyacrylonitrile | n,n-dimethylformamide | 900 | 5 | $MgNb_{20}O_{51}$ |
| 54 | Mg:Nb = 1:20 | magnesium acetylacetonate | niobium ethoxide | citric acid | polyvinylpyrrolidone | ethanol | 850 | 4 | $MgNb_{20}O_{51}$ |
| 55 | Mg:Nb = 1:20 | magnesium acetylacetonate | niobium ethoxide | citric acid | polyacrylonitrile | n,n-dimethylformamide | 900 | 5 | $MgNb_{20}O_{51}$ |
| 56 | Mg:Nb = 1:20 | magnesium acetylacetonate | niobium oxalate | acetic acid | polyvinylpyrrolidone | ethanol | 950 | 5 | $MgNb_{20}O_{51}$ |
| 57 | Mg:Nb = 1:20 | magnesium acetylacetonate | niobium oxalate | acetic acid | polyacrylonitrile | n,n-dimethylformamide | 900 | 4 | $MgNb_{20}O_{51}$ |
| 58 | Mg:Nb = 1:20 | magnesium acetylacetonate | niobium oxalate | citric acid | polyvinylpyrrolidone | ethanol | 900 | 5 | $MgNb_{20}O_{51}$ |
| 59 | Mg:Nb = 1:20 | magnesium acetylacetonate | niobium oxalate | citric acid | polyacrylonitrile | n,n-dimethylformamide | 950 | 4 | $MgNb_{20}O_{51}$ |

Examples 60-76 provide methods for preparing $M_xNb_yO_z$ electrode material by template-directed method, which is specifically described as follows:

Example 60

This example provides a method for preparing $Cu_2Nb_{34}O_{87}$ electrode material by template-directed method, comprising the following steps:

S11: preparing monodispersed polystyrene emulsion by soap-free emulsion method;

S12: preparing a colloidal crystal template using the monodispersed polystyrene emulsion by evaporation self-assembly method at 60° C.;

S13: dissolving 0.001 mol of copper oxide and 0.017 mol of niobium ethoxide into 10 ml of ethanol to obtain a copper-niobium mixture solution;

S14: putting the colloidal crystal template into the mixture solution for 12 h, then, taking out the template, and drying the template at 60° C.;

S15: sintering the dried template at 800° C. for 4 h to obtain electrode material $Cu_2Nb_{34}O_{87}$ powder.

Example 61

This example provides a method for preparing $CaNb_8O_{21}$ electrode material by template-directed method, comprising the following steps:

S11: preparing monodispersed polystyrene emulsion by soap-free emulsion method;

S12: preparing a colloidal crystal template using the monodispersed polystyrene emulsion by evaporation self-assembly method at 60° C.;

S13: dissolving 0.001 mol calcium chloride and 0.017 mol niobium ethoxide into 10 ml of ethanol to obtain a calcium-niobium mixture solution;

S14: immersing the colloidal crystal template into the mixture solution for 12 h, then, taking out the template, and drying the template at 60° C.;

S15: sintering the dried template at 800° C. for 4 h to obtain electrode material $CaNb_8O_{21}$ powder.

The present invention further provided examples 62~79 which provide methods for preparing $M_xNb_yO_z$ electrode material by template-directed method with M source and niobium source. Table 3 shows M source, niobium source, organic solvent, and mixing ratio of the organic solvent, sintering time, sintering temperature, and final products of examples 62~79.

TABLE 3

| Example number | Molar ration of elements | M source (M = Cu, Ca) | Niobium source | Organic solvent | Sintering temperature (° C.) | Sintering time (h) | Final product |
|---|---|---|---|---|---|---|---|
| 62 | Cu:Nb = 1:17 | copper chloride | niobium ethoxide | n,n-dimethylformamide | 800 | 5 | $Cu_2Nb_{34}O_{87}$ |
| 63 | Cu:Nb = 1:17 | copper chloride | niobium oxalate | ethanol | 850 | 4 | $Cu_2Nb_{34}O_{87}$ |

TABLE 3-continued

| Example number | Molar ration of elements | M source (M = Cu, Ca) | Niobium sourcce | Organic solvent | Sintering temperature (° C.) | Sintering time (h) | Final product |
|---|---|---|---|---|---|---|---|
| 64 | Cu:Nb = 1:17 | copper chloride | niobium powder | n, n-dimethylformamide | 900 | 3 | $Cu_2Nb_{34}O_{87}$ |
| 65 | Cu:Nb = 1:17 | Copper acetylacetonate | niobium ethoxide | ethanol | 850 | 4 | $Cu_2Nb_{34}O_{87}$ |
| 66 | Cu:Nb = 1:17 | Copper acetylacetonate | niobium oxalate | n, n-dimethylformamide | 900 | 5 | $Cu_2Nb_{34}O_{87}$ |
| 67 | Cu:Nb = 1:17 | Copper acetylacetonate | niobium powder | ethanol | 800 | 3 | $Cu_2Nb_{34}O_{87}$ |
| 68 | Cu:Nb = 1:17 | Copper acetate | niobium ethoxide | n, n-dimethylformamide | 850 | 3 | $Cu_2Nb_{34}O_{87}$ |
| 69 | Cu:Nb = 1:17 | Copper acetate | niobium oxalate | ethanol | 800 | 5 | $Cu_2Nb_{34}O_{87}$ |
| 70 | Cu:Nb = 1:17 | Copper acetate | niobium powder | n, n-dimethylformamide | 900 | 4 | $Cu_2Nb_{34}O_{87}$ |
| 71 | Ca:Nb = 1:8 | Calcium chloride | niobium ethoxide | n, n-dimethylformamide | 800 | 5 | $CaNb_8O_{21}$ |
| 72 | Ca:Nb = 1:8 | Calcium chloride | niobium oxalate | ethanol | 850 | 4 | $CaNb_8O_{21}$ |
| 73 | Ca:Nb = 1:8 | Calcium chloride | niobium powder | n, n-dimethylformamide | 900 | 3 | $CaNb_8O_{21}$ |
| 74 | Ca:Nb = 1:8 | Calcium acetylacetonate | niobium ethoxide | ethanol | 850 | 4 | $CaNb_8O_{21}$ |
| 75 | Ca:Nb = 1:8 | Calcium acetylacetonate | niobium oxalate | n, n-dimethylformamide | 900 | 5 | $CaNb_8O_{21}$ |
| 76 | Ca:Nb = 1:8 | Calcium acetylacetonate | niobium powder | ethanol | 800 | 3 | $CaNb_8O_{21}$ |
| 77 | Ca:Nb = 1:8 | Calcium acetate | niobium ethoxide | n, n-dimethylformamide | 850 | 3 | $CaNb_8O_{21}$ |
| 78 | Ca:Nb = 1:8 | Calcium acetate | niobium oxalate | ethanol | 800 | 5 | $CaNb_8O_{21}$ |
| 79 | Ca:Nb = 1:8 | Calcium acetate | niobium powder | n, n-dimethylformamide | 900 | 4 | $CaNb_8O_{21}$ |

Figure 2:
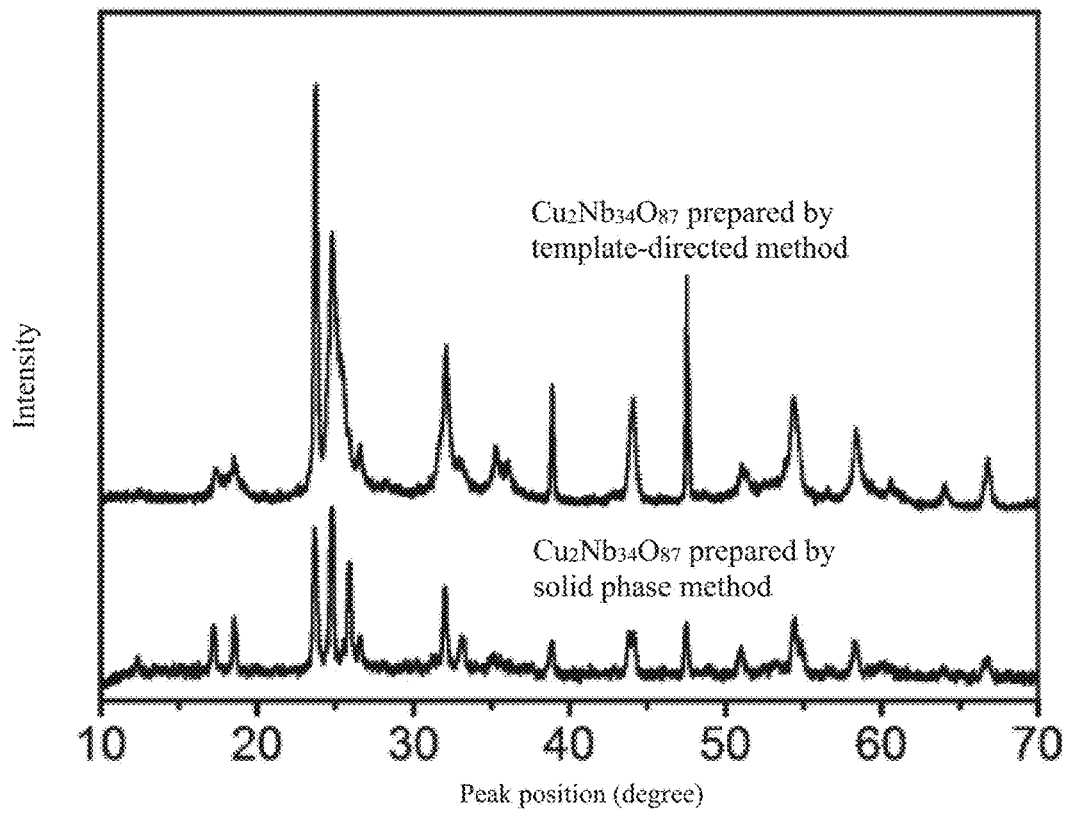
FIG. 2 shows X-ray diffraction patterns of $Cu_2Nb_{34}O_{87}$ produced in example 2 and example 60 of the present invention.
Figure 3:
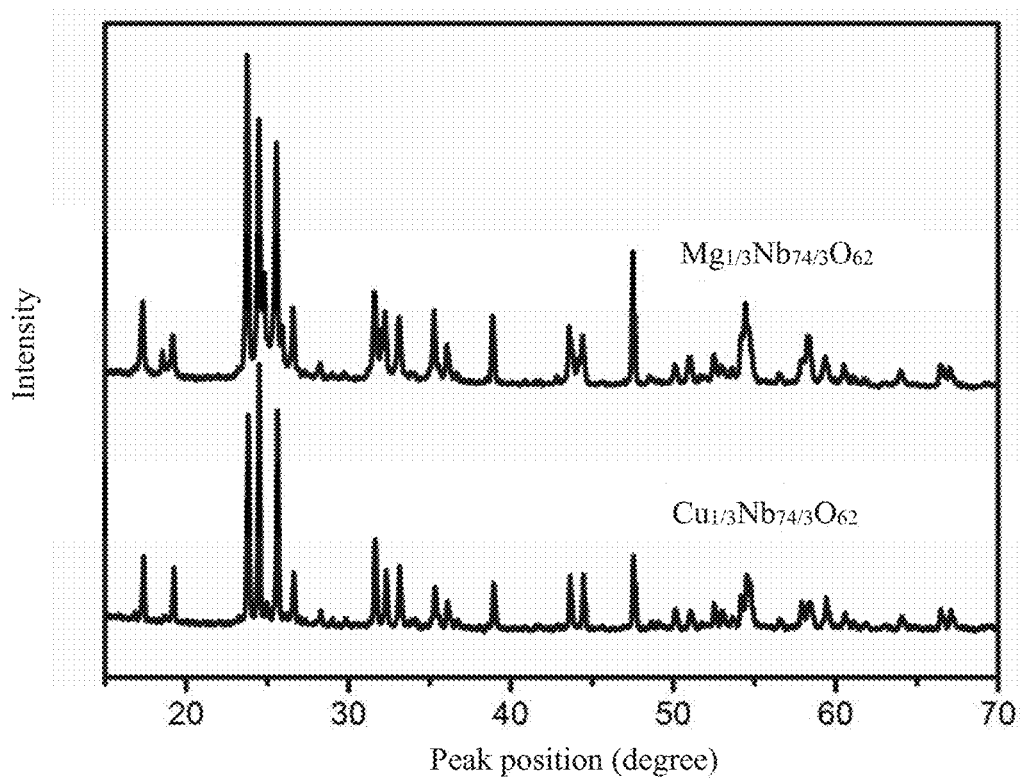
FIG. 3 shows X-ray diffraction patterns of $Mg_{1/3}Nb_{74/3}O_{62}$ and $Cu_{1/3}Nb_{74/3}O_{62}$ produced in example 5 and example 6 of the present invention.

Examples 1 through 79 provide various $M_xNb_yO_z$ electrode material manufactured by different methods. A crystal form and a morphology of $Zn_2Nb_{34}O_{87}$ and $Cu_2Nb_{34}O_{87}$ electrode material produced in examples 1, 2, 43, 60 are tested by X-ray diffraction (XRD) and scanning electron microscopy. FIG. 1 shows XRD patterns of $Zn_2Nb_{34}O_{87}$ produced in examples 1, 43. FIG. 2 shows XRD patterns of $Cu_2Nb_{34}O_{87}$ produced in examples 2, 60. FIG. 3 shows XRD patterns of $Mg_{1/3}Nb_{74/3}O_{62}$ and $Cu_{1/3}Nb_{74/3}O_{62}$ produced in examples 5, 6, respectively. As shown in FIG. 1, in example 1 and example 43, $Zn_2Nb_{34}O_{87}$ material are pure material manufactured by solid phase method and electrospinning, thus, it is seen that $Zn_2Nb_{34}O_{87}$ material can be successfully prepared by solid phase method and electrospinning method. As shown in FIG. 2, in example 2 and example 60, $Cu_2Nb_{34}O_{87}$ material are pure material manufactured by solid phase method and template-directed method, thus, it is seen that the $Cu_2Nb_{34}O_{87}$ material can be successfully manufactured by solid phase method and template-directed method. As shown in FIG. 3, $Mg_{1/3}Nb_{74/3}O_{62}$ material produced in example 5 and $Cu_{1/3}Nb_{74/3}O_{62}$ material produced in example 6 are pure material, thus, it is seen that $Mg_{1/3}Nb_{74/3}O_{62}$ material and $Cu_{1/3}Nb_{74/3}O_{62}$ material can be successfully manufactured by solid phase method.

Figure 4:
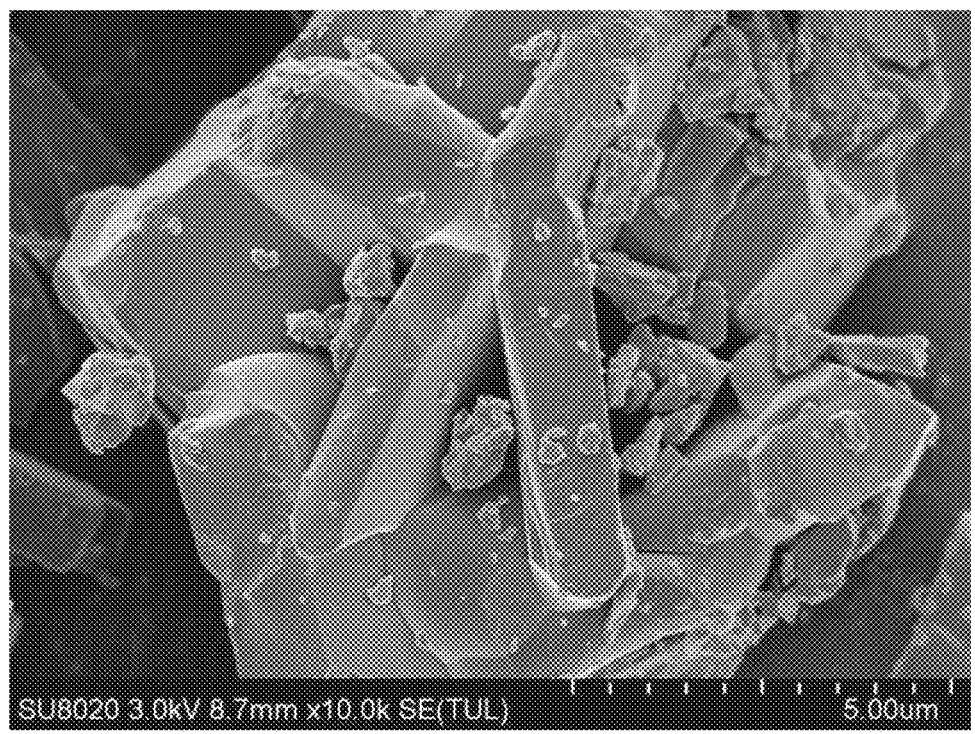
FIG. 4 is an electron microscope picture of $Zn_2Nb_{34}O_{87}$ produced in example 1 of the present invention.
Figure 5:
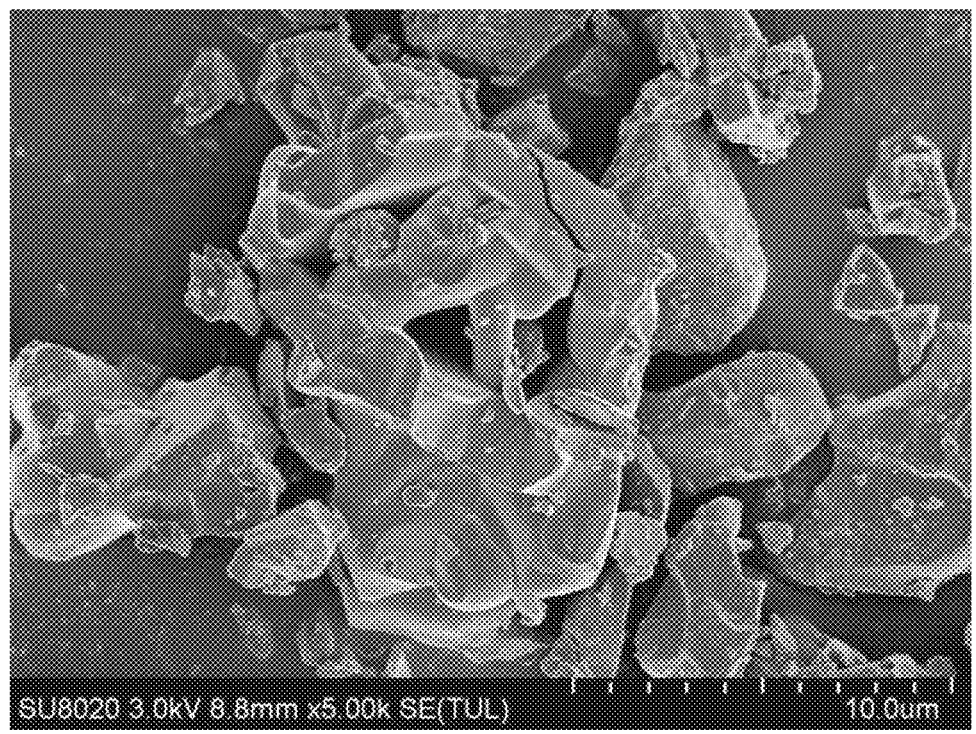
FIG. 5 is an electron microscope picture of $Cu_2Nb_{34}O_{87}$ produced in example 2 of the present invention.
Figure 6:
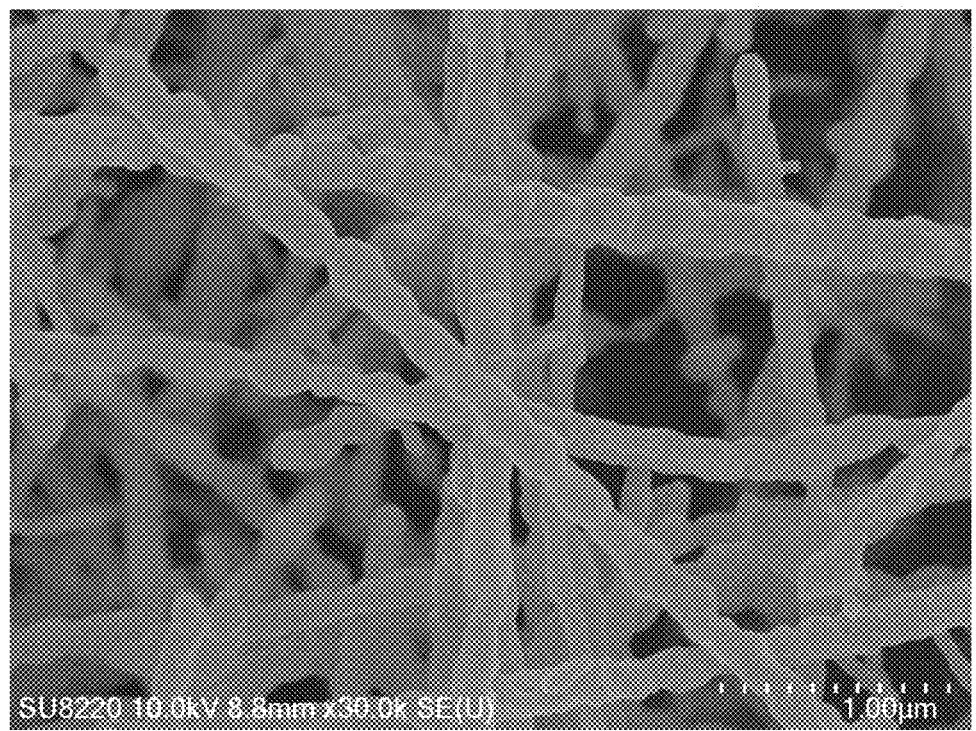
FIG. 6 is an electron microscope picture of $Zn_2Nb_{34}O_{87}$ produced in example 43 of the present invention.
Figure 7:
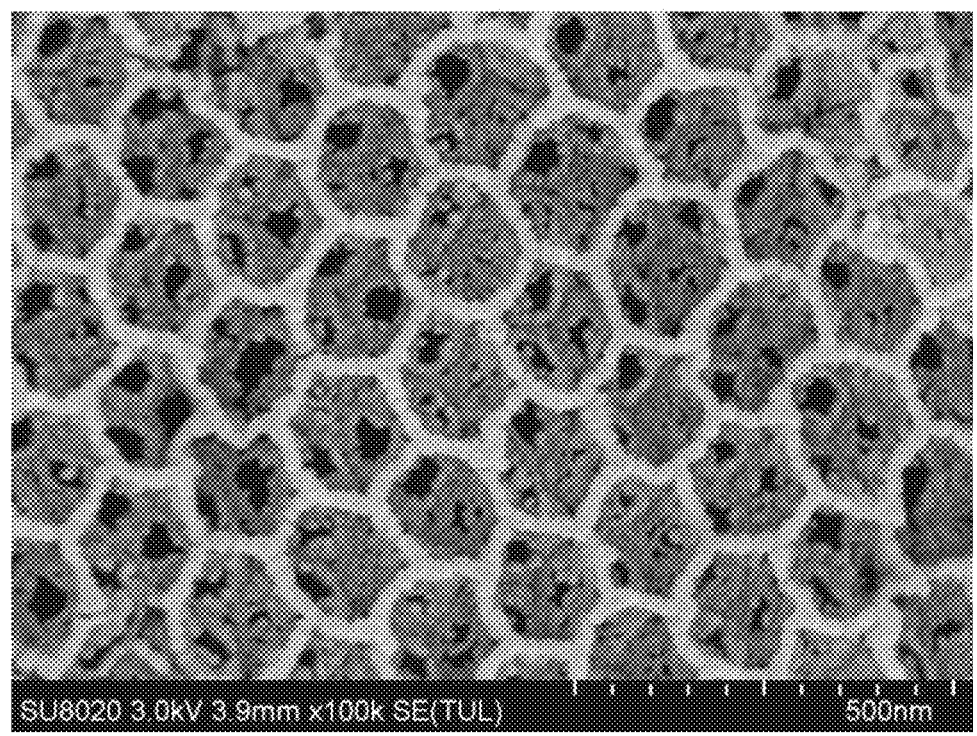
FIG. 7 is an electron microscope picture of $Cu_2Nb_{34}O_{87}$ produced in example 60 of the present invention.

FIG. 4 shows a scanning electron microscopy image of $Zn_2Nb_{34}O_{87}$ material produced in example 1. As shown in FIG. 4, $Zn_2Nb_{34}O_{87}$ material produced in example 1 has an irregular shape, and the size of the particle is ranged from 3 μm to 5 μm. FIG. 5 shows a scanning electron microscopy image of $Cu_2Nb_{34}O_{87}$ material produced in example 2. As shown in FIG. 5, $Cu_2Nb_{34}O_{87}$ material produced in example 2 has an irregular shape, and the size of the particle is ranged from 3 μm to 5 μm. FIG. 6 shows a scanning electron microscopy image of $Zn_2Nb_{34}O_{87}$ material produced in example 43. As shown in FIG. 6, $Zn_2Nb_{34}O_{87}$ material produced in example 43 has a one-dimensional nano-fiber structure, and the size of the fiber is about 100 nanometer. FIG. 7 shows a scanning electron microscopy image of $Cu_2Nb_{34}O_{87}$ material produced in example 60. As shown in FIG. 7, $Cu_2Nb_{34}O_{87}$ material produced in example 60 has an ordered macroporous structure.

Electrochemical properties of $M_xNb_yO_z$ electrode material manufactured by different methods are measured in examples 80~83, specifically described as following:

Example 80

This example provides a non-aqueous electrolyte ion half-cell manufactured by solid phase method, specifically, a non-aqueous electrolyte ion half-cell is manufactured by using $Zn_2Nb_{34}O_{87}$ material produced by solid phase method in example 1 as a positive active material, Li plate as a negative electrode, using a polyethylene diaphragm, using a lithium hexafluorophosphate as electrolyte salt.

The nonaqueous electrolyte lithium ion half-cell is subjected to repeated charge-discharge cycle test at a voltage range from 0.8V to 3V. The initial discharge capacity reached to 275 mAh/g, and 500 stable cycles can be repeated at the current density of 10 C.

Examples 81

This example provides a non-aqueous electrolyte ion half-cell manufactured by electrospinning method, specifically, a non-aqueous electrolyte ion half-cell is manufactured by using $Zn_2Nb_{34}O_{87}$ material produced by electrospinning method in example 43 as the positive active material, Li plate as the negative electrode, using the polyethylene diaphragm, using the lithium hexafluorophosphate as the electrolyte salt.

The nonaqueous electrolyte lithium ion half-cell is subjected to repeated charge-discharge cycle test at the voltage range from 0.8V to 3V. The initial discharge capacity reached to 328 mAh/g, and 500 stable cycles can be repeated at the current density of 10 C.

Examples 82

This example provides a non-aqueous electrolyte ion half-cell manufactured by using $Cu_2Nb_{34}O_{87}$ material which is prepared by solid phase method, specifically, the non-aqueous electrolyte ion half-cell is prepared by using $Cu_2Nb_{34}O_{87}$ material produced by solid phase method in example 2 as the positive active material, Li plate as the negative electrode, the polyethylene diaphragm, the lithium hexafluorophosphate as the electrolyte salt.

The nonaqueous electrolyte lithium ion half-cell is subjected to repeated charge-discharge cycle test at the voltage range from 0.8V to 3V. The initial discharge capacity reached to 286 mAh/g, and 500 stable cycles can be repeated at the current density of 10 C.

Examples 83

This example provides a non-aqueous electrolyte ion half-cell manufactured by using $Cu_2Nb_{34}O_{87}$ material which is prepared by template-directed method, specifically, the non-aqueous electrolyte ion half-cell is prepared by using $Cu_2Nb_{34}O_{87}$ material produced by template-directed method in example 60 as the positive active material, Li plate as the negative electrode, the polyethylene diaphragm, and the lithium hexafluorophosphate as the electrolyte salt.

The nonaqueous electrolyte lithium ion half-cell is subjected to repeated charge-discharge cycle test at the voltage range from 0.8V to 3V. The initial discharge capacity reached to 339 mAh/g, and 500 stable cycles can be repeated at the current density of 10 C.

Figure 8:
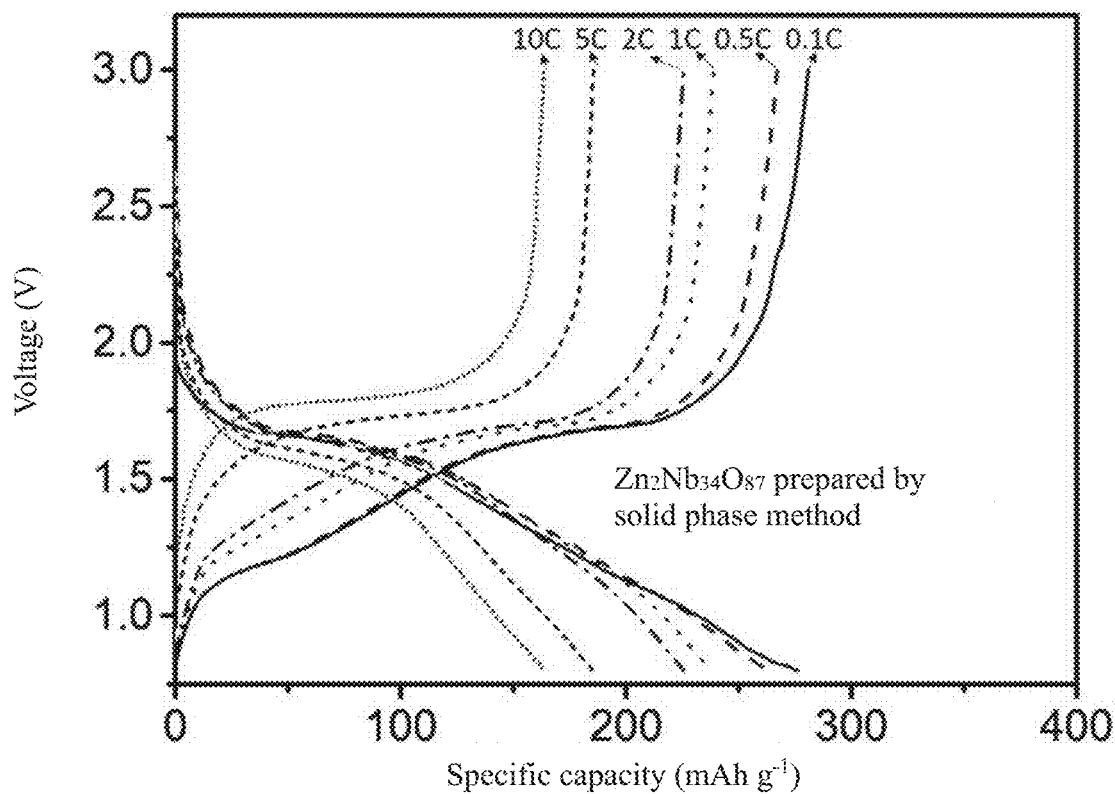
FIG. 8 shows a rate performance of $Zn_2Nb_{34}O_{87}$ half-cell produced in example 1 of the present invention.
Figure 9:
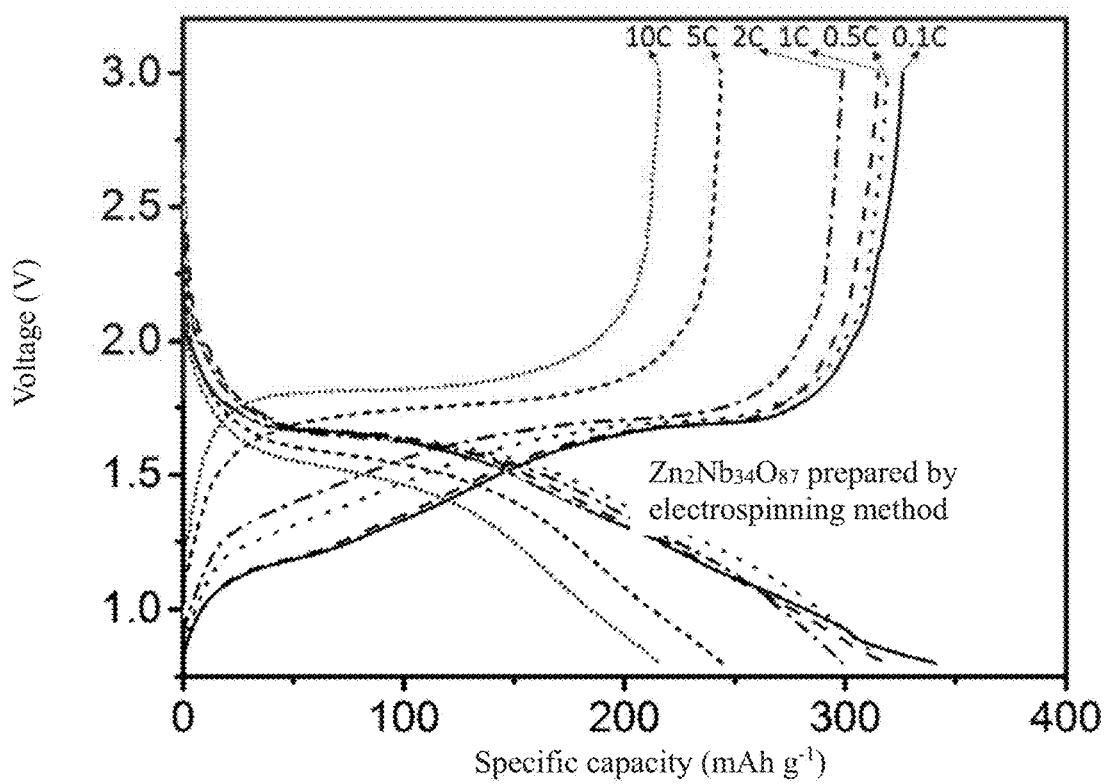
FIG. 9 shows a rate performance of $Zn_2Nb_{34}O_{87}$ half-cell produced in example 43 of the present invention.
Figure 10:
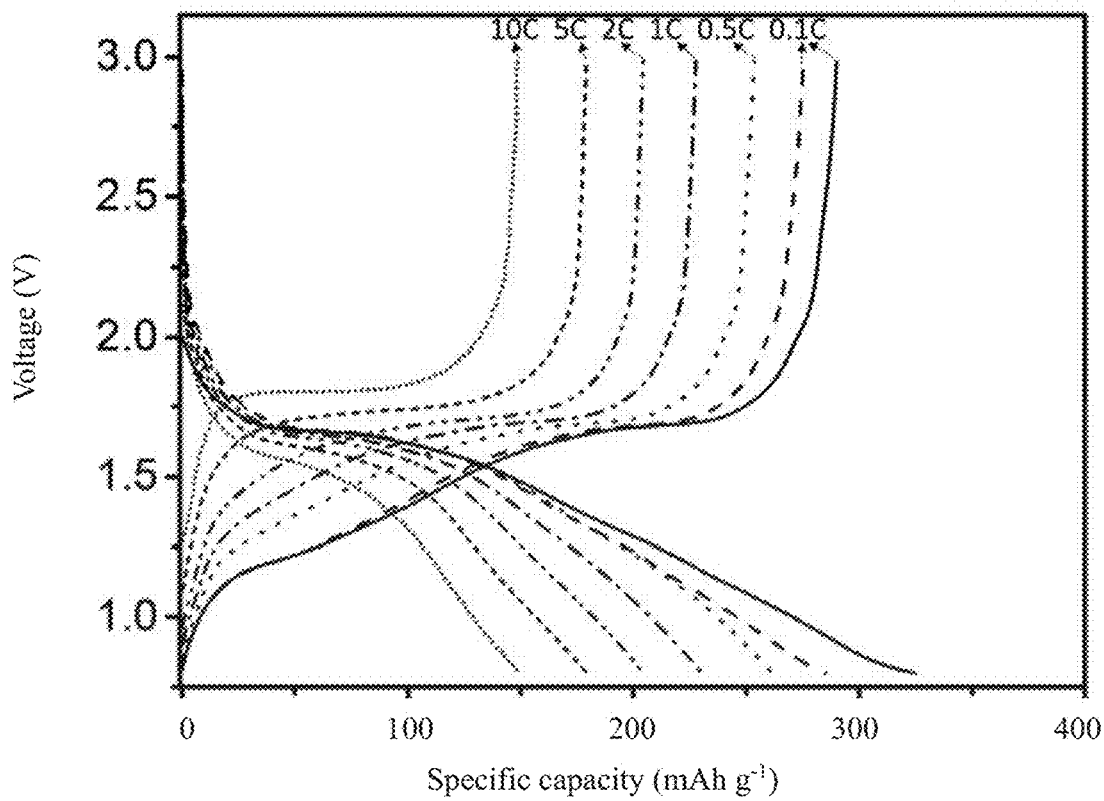
FIG. 10 shows a rate performance of $Cu_2Nb_{34}O_{87}$ half-cell produced in example 2 of the present invention.
Figure 11:
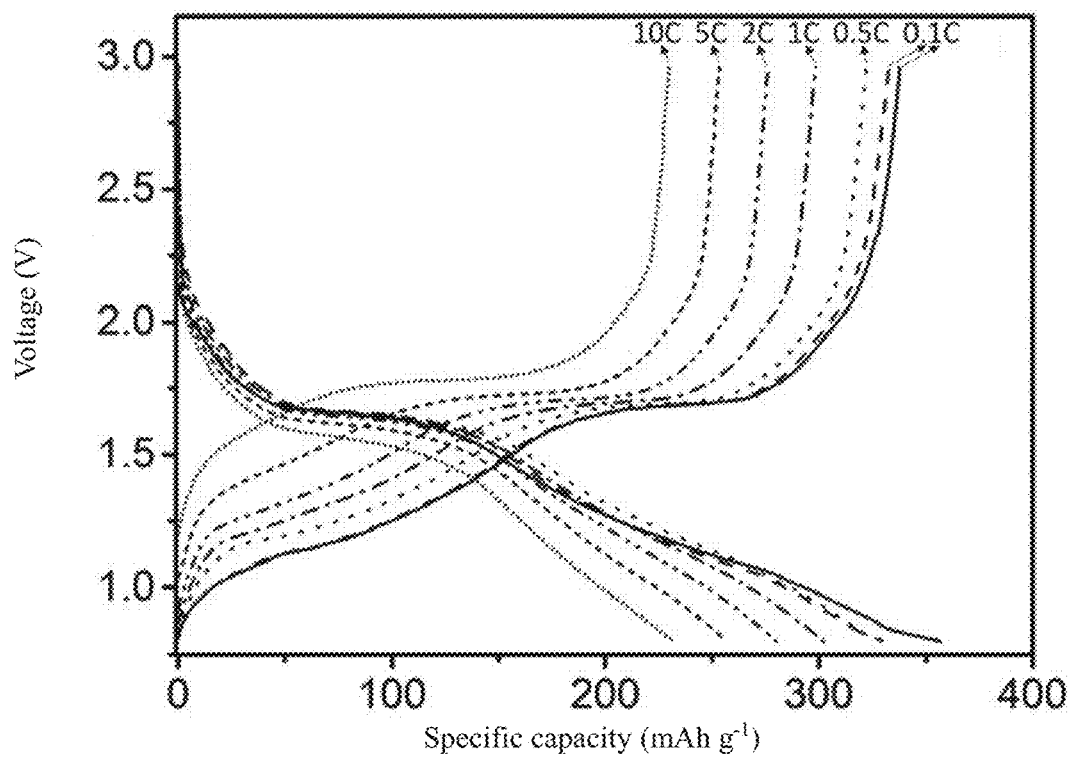
FIG. 11 shows a rate performance of $Cu_2Nb_{34}O_{87}$ half-cell produced in example 60 of the present invention.
Figure 12:
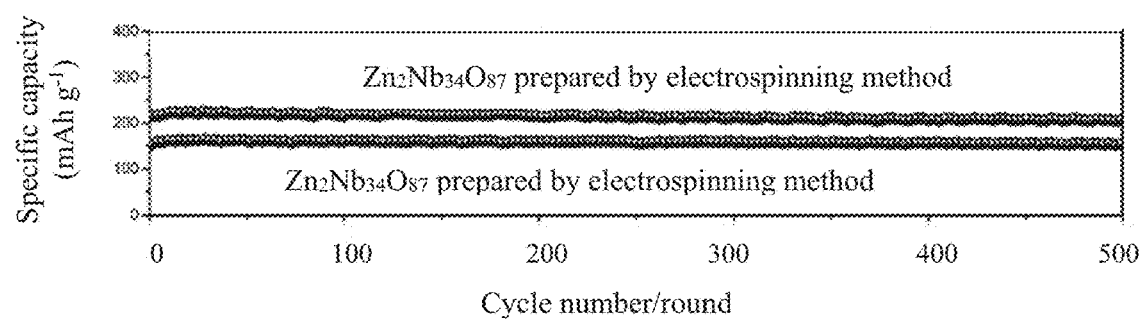
FIG. 12 shows a cycle performance of $Zn_2Nb_{34}O_{87}$ half-cell produced in example 1 and example 43 of the present invention measured at the current density of 10 C.
Figure 13:
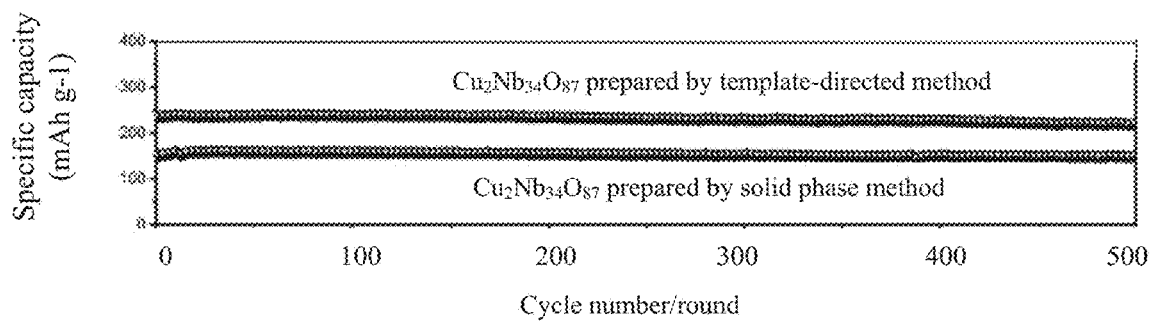
FIG. 13 shows a cycle performance of $Cu_2Nb_{34}O_{87}$ half-cell produced in example 2 and example 60 of the present invention measured at the current density of 10 C.

FIG. 8 and FIG. 9 shows rate performance of $Zn_2Nb_{34}O_{87}$ material produced in example 1 and example 43 of the present invention. As shown in FIG. 8, an initial charge-discharge coulomb efficiency of $Zn_2Nb_{34}O_{87}$ material manufactured by solid phase method is 98.2% under 0.1 C ratio, the reversible specific capacity reached to 274 mAh g-1, and the reversible specific capacity also reached to 162 mAh g-1 under 10 C ratio. As shown in FIG. 9, the initial charge-discharge coulomb efficiency of $Zn_2Nb_{34}O_{87}$ material manufactured by electrospinning method is 94.5% under 0.1 C ratio, the reversible specific capacity reached to 311 mAh g-1, and the reversible specific capacity also reached to 212 mAh g-1 under 10 C ratio. FIG. 10, FIG. 11 respectively show ratio performance of $Cu_2Nb_{34}O_{87}$ material produced in example 60 and example 2. As shown in FIG. 10, the initial charge-discharge coulomb efficiency of $Cu_2Nb_{34}O_{87}$ material manufactured by solid phase method is 87.2% under 0.1 C ratio, the reversible specific capacity reached to 294 mAh g-1, and the reversible specific capacity also reached to 138.8 mAh g-1 under 10 C ratio. As shown in FIG. 11, the initial charge-discharge coulomb efficiency of $Cu_2Nb_{34}O_{87}$ material manufactured by template-directed method is 92.3% under 0.1 C ratio, the reversible specific capacity reached to 321 mAh g-1, and the reversible specific capacity also reached to 232 mAh g-1 under 10 C ratio. FIG. 12 and FIG. 13 show cycle performance of $Zn_2Nb_{34}O_{87}$ material and $Cu_2Nb_{34}O_{87}$ material produced in example 1, example 43, example 2 and example 60 at the current density of 10 C. As shown in FIG. 12, $Zn_2Nb_{34}O_{87}$ material produced by solid phase method in example 1 repeats 500 cycles at the current density of 10 C, 86.4% of capacity is remained. $Cu_2Nb_{34}O_{87}$ material produced by template-directed method in example 60 repeats 500 cycles at the current density of 10 C, 88.9% of capacity is remained. Thus, $M_xNb_yO_z$ electrode material manufactured by three methods all have excellent electrochemical performance, which are suitable for high performance non-aqueous electrolyte battery.

The following examples provide a solid state lithium ion non-aqueous electrolyte battery with $M_xNb_yO_z$ electrode material used as the anode material.

Examples 84 through 95 provide methods for preparing solid state battery with $M_xNb_yO_z$ electrode material used as the anode material, which comprises the following steps:

dissolving a solid non-aqueous electrolyte into an organic solvent to obtain liquid gel;

mixing the positive active material, electric conductive agent and the liquid gel uniformally to obtain a mixture, coating the mixture on the positive current collector, and then soliding to obtain a positive electrode plate;

mixing the negative active material, electric conductive agent and the liquid gel uniformly to form a mixture, then coating the mixture on the negative current collector, and then soliding to obtain a negative electrode plate; balling the solid non-aqueous electrolyte, and then dissolving such balled solid non-aqueous electrolyte into an organic solvent to obtain a slurry; coating the slurry on the negative soliding material to form a dielectric layer, then soliding to obtain a negative electrode plate;

assembling the positive electrode plate and the negative electrode plate by laminating technology, to obtain a solid non-aqueous electrolyte lithium ion battery.

According to specific examples, preferably, the soliding temperature for the positive electrode plate is ranged from 60° C. to 150° C., the soliding time is ranged from 2 h to 11 h; the soliding temperature for the negative solid material and negative electrode plate is ranged from 70° C. to 160° C., the soliding time is ranged from 60 s to 300 s.

Example 84

The solid battery is prepared by using $Zn_2Nb_{34}O_{87}$ material produced by solid phase method as the negative active material, using $LiFePO_4$ as positive active material, using $Li_{9.54}Si_{1.74}P_{1.44}S_{11.7}C_{10.3}$ as the solid electrolyte.

Figure 14:
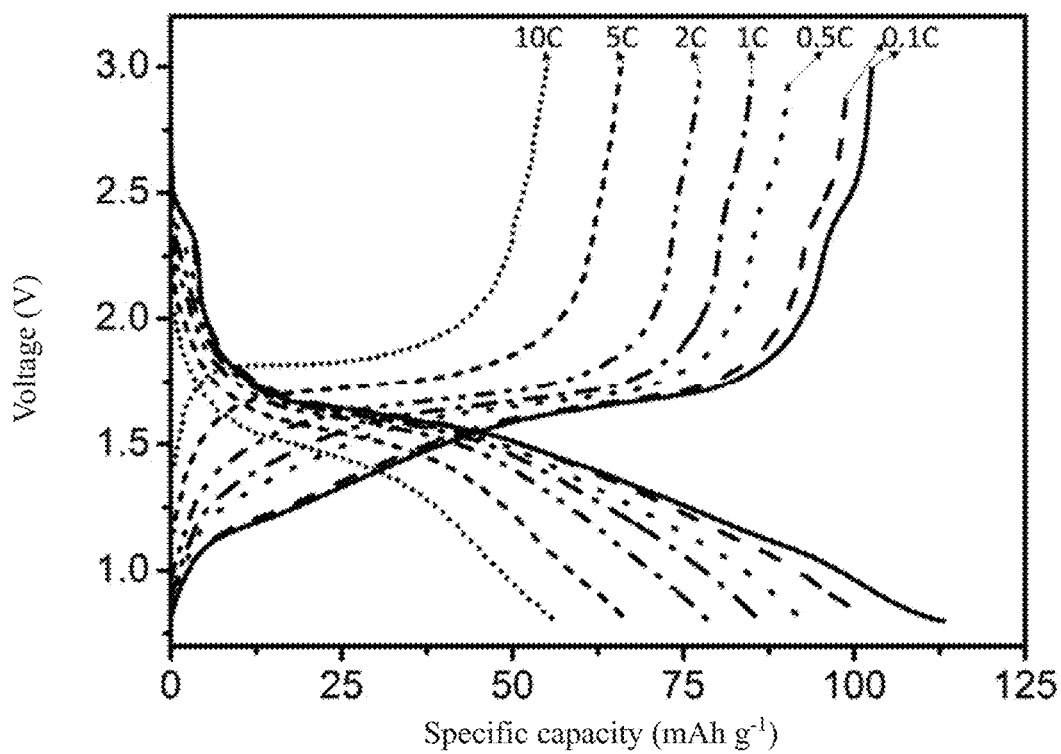
FIG. 14 shows a rate performance of $Zn_2Nb_{34}O_{87}$/$LiFePO_4$ solid state battery produced in example 84 of the present invention.
Figure 15:
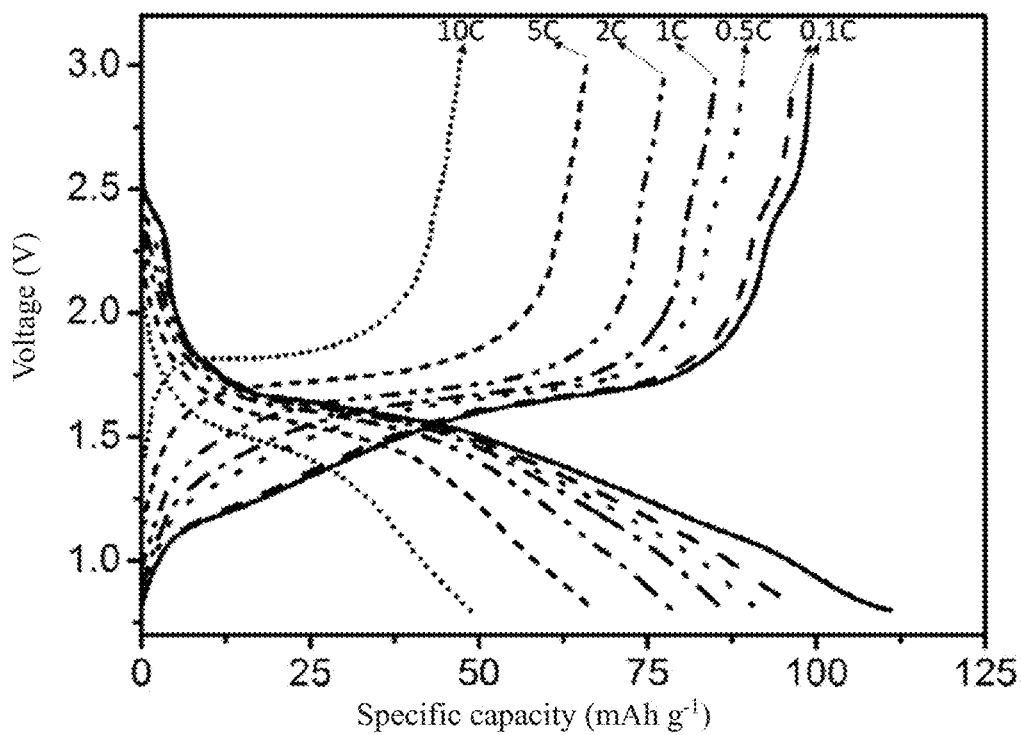
FIG. 15 shows a rate performance of $Cu_2Nb_{34}O_{87}$/$LiFePO_4$ solid state battery produced in example 86 of the present invention.
Figure 16:
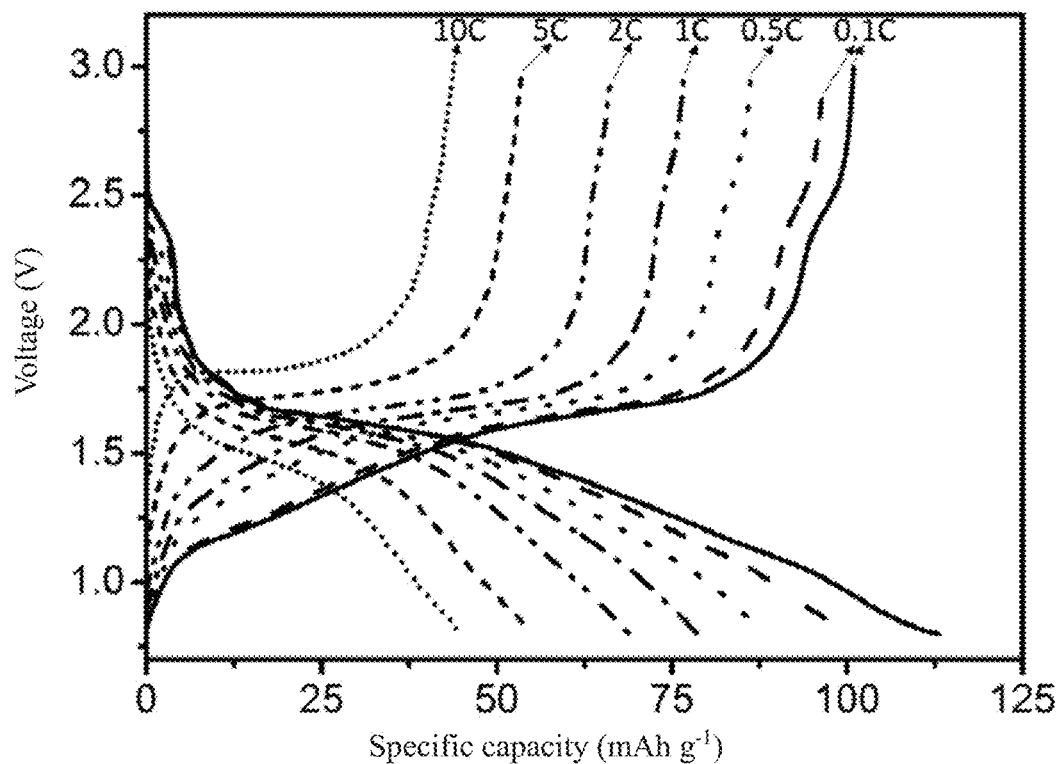
FIG. 16 shows a rate performance of $Mg_{1/3}Nb_{74/3}O_{62}$/$LiFePO_4$ solid state battery produced in example 92 of the present invention.

The solid battery is subjected to repeated charge-discharge cycle tests at a voltage range from 0.8V to 3V. As shown in FIG. 14, the initial discharge capacity reached to 113 mAh/g, and 40 stable cycles can be repeated at the current density of 10 C.

Example 85

The solid battery is prepared by using $Zn_2Nb_{34}O_{87}$ material produced by electrospinning method as the negative active material, using $LiFePO_4$ as positive active material, using $Li_{9.54}Si_{1.74}P_{1.44}S_{11.7}C_{10.3}$ as the solid electrolyte.

The solid battery is subjected to repeated charge-discharge cycle tests at a voltage range from 0.8V to 3V. The initial discharge capacity reached to 116 mAh/g, and 55 stable cycles can be repeated.

Example 86

The solid battery is prepared by using $Cu_2Nb_{34}O_{87}$ material produced by solid phase method as the negative active material, using LiFePO$_4$ as positive active material, using Li$_{9.54}$Si$_{1.74}$P$_{1.44}$S$_{11.7}$C$_{10.3}$ as the solid electrolyte.

The solid battery is subjected to repeated charge-discharge cycle tests at a voltage range from 0.8V to 3V. The initial discharge capacity reached to 108 mAh/g, and 60 stable cycles can be repeated.

Example 87

The solid battery is prepared by using Cu$_2$Nb$_{34}$O$_{87}$ material produced by template-directed method as the negative active material, using LiFePO$_4$ as positive active material, using Li$_{9.54}$Si$_{1.74}$P$_{1.44}$S$_{11.7}$C$_{10.3}$ as the solid electrolyte.

The solid battery is subjected to repeated charge-discharge cycle tests at a voltage range from 0.8V to 3V. The initial discharge capacity reached to 121 mAh/g, and 85 stable cycles can be repeated.

Example 88

The solid battery is prepared by using MgNb$_2$O$_{51}$ material produced by electrospinning method as the negative active material, using LiFePO$_4$ as positive active material, using Li$_{9.54}$Si$_{1.74}$P$_{1.44}$S$_{11.7}$C$_{10.3}$ as the solid electrolyte.

The solid battery is subjected to repeated charge-discharge cycle tests at a voltage range from 0.8V to 3V. The initial discharge capacity reached to 102 mAh/g, and 50 stable cycles can be repeated.

Example 89

The solid battery is prepared by using MgNb$_2$O$_{51}$ material produced by solid phase method as the negative active material, using LiFePO$_4$ as positive active material, using Li$_{9.54}$Si$_{1.74}$P$_{1.44}$S$_{11.7}$C$_{10.3}$ as the solid electrolyte.

The solid battery is subjected to repeated charge-discharge cycle tests at a voltage range from 0.8V to 3V. The initial discharge capacity reached to 96 mAh/g, and 70 stable cycles can be repeated.

Example 90

The solid battery is prepared by using CaNb$_8$O$_{21}$ material produced by solid phase method as the negative active material, using LiFePO$_4$ as positive active material, using Li$_3$PS$_4$ as the solid electrolyte.

The solid battery is subjected to repeated charge-discharge cycle tests at a voltage range from 0.8V to 3V. The initial discharge capacity reached to 86 mAh/g, and 55 stable cycles can be repeated.

Example 91

The solid battery is prepared by using CaNb$_8$O$_{21}$ material produced by template-directed method as the negative active material, using LiFePO$_4$ as positive active material, using Li$_3$PS$_4$ as the solid electrolyte.

The solid battery is subjected to repeated charge-discharge cycle tests at a voltage range from 0.8V to 3V. The initial discharge capacity reached to 97 mAh/g, and 60 stable cycles can be repeated.

Example 92

The solid battery is prepared by using Mg$_{1/3}$Nb$_{74/3}$O$_{62}$ material produced by solid phase method as the negative active material, using LiFePO$_4$ as positive active material, using Li$_3$PS$_4$ as the solid electrolyte.

Figure 17:
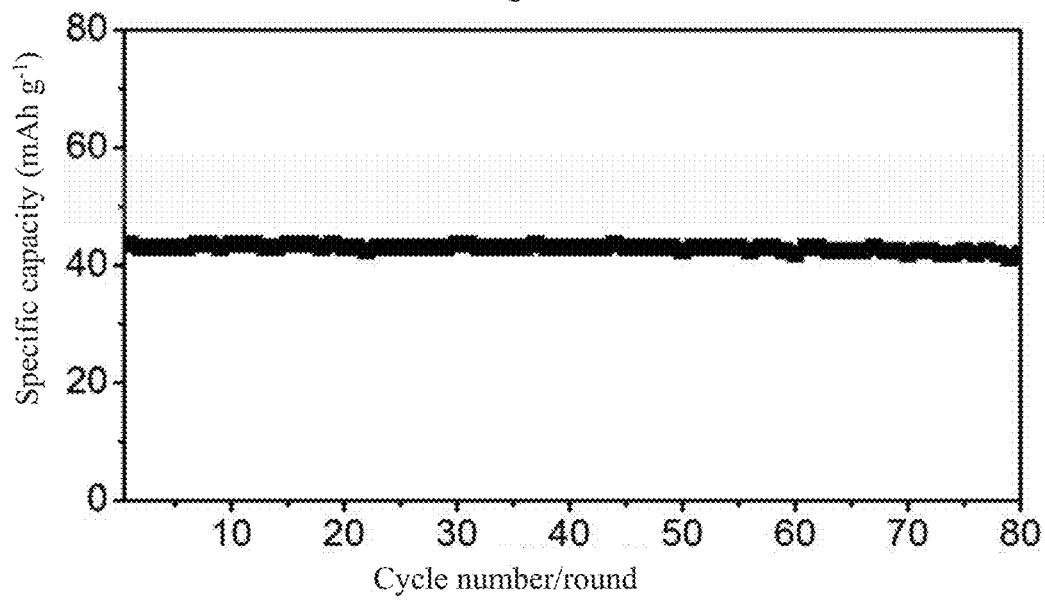
FIG. 17 shows a cycle performance of $Mg_{1/3}Nb_{74/3}O_{62}$/$LiFePO_4$ solid state battery produced in example 92 of the present invention measured at the current density of 10 C.

The solid battery is subjected to repeated charge-discharge cycle tests at a voltage range from 0.8V to 3V. The initial discharge capacity reached to 114 mAh/g, and as shown in FIG. 17, 80 stable cycles can be repeated at the current density of 10 C.

Example 93

The solid battery is prepared by using Cu$_{1/3}$Nb$_{74/3}$O$_{62}$ material produced by solid phase method as the negative active material, using LiFePO$_4$ as positive active material, using Li$_3$PS$_4$ as the solid electrolyte.

Figure 18:
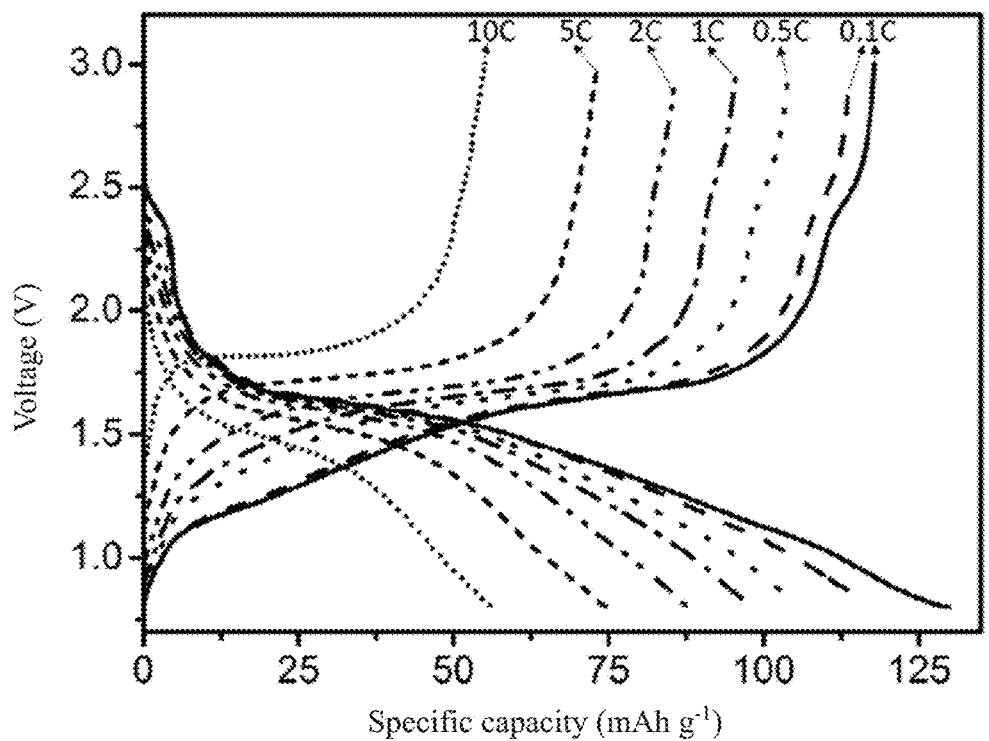
FIG. 18 shows a rate performance of $Cu_{1/3}Nb_{74/3}O_{62}$/$LiFePO_4$ solid state battery produced in example 93 of the present invention.
Figure 19:
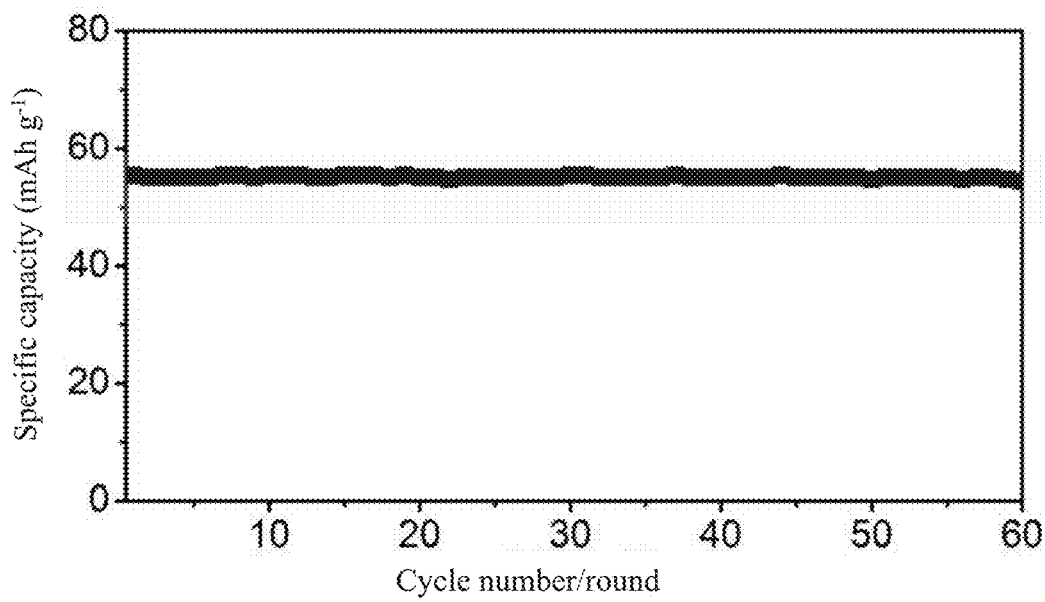
FIG. 19 shows a cycle performance of $Cu_{1/3}Nb_{74/3}O_{62}$/$LiFePO_4$ solid state battery produced in example 93 of the present invention measured at the current density of 10 C.

The solid battery is subjected to repeated charge-discharge cycle tests at a voltage range from 0.8V to 3V. As shown in FIG. 18, the initial discharge capacity reached to 130 mAh/g, and as shown in FIG. 19, 60 stable cycles can be repeated at the current density of 10 C.

Example 94

The solid battery is prepared by using CaNb$_{20}$O$_5$ material produced in Example 30 as the negative active material, using LiFePO$_4$ as positive active material, using Li$_{9.54}$Si$_{1.74}$P$_{1.44}$S$_{11.7}$C$_{10.3}$ as the solid electrolyte.

Figure 20:
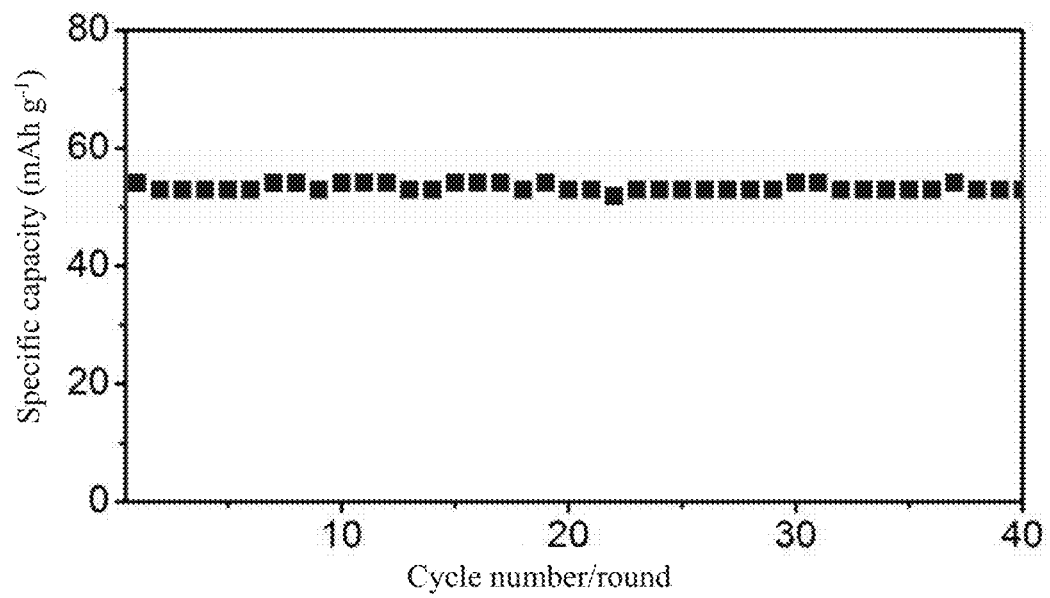
FIG. 20 shows a cycle performance of $CaNb_{20}O_5$/$LiNi_{0.5}Mn_{1.5}O_4$ solid state battery produced in example 30 of the present invention measured at the current density of 10 C.

The cycle performance of the solid battery is tested. As shown in FIG. 20, CaNb$_{20}$O$_5$/LiNi$_{0.5}$Mn$_{1.5}$O$_4$ solid battery can repeat 40 stable cycles at the current density of 10 C.

Example 95

The solid battery is prepared by using ZnNb$_8$O$_{21}$ material produced in Example 34 as the negative active material, using LiFePO$_4$ as positive active material, using Li$_{9.54}$Si$_{1.74}$P$_{1.44}$S$_{11.7}$C$_{10.3}$ as the solid electrolyte.

Figure 21:
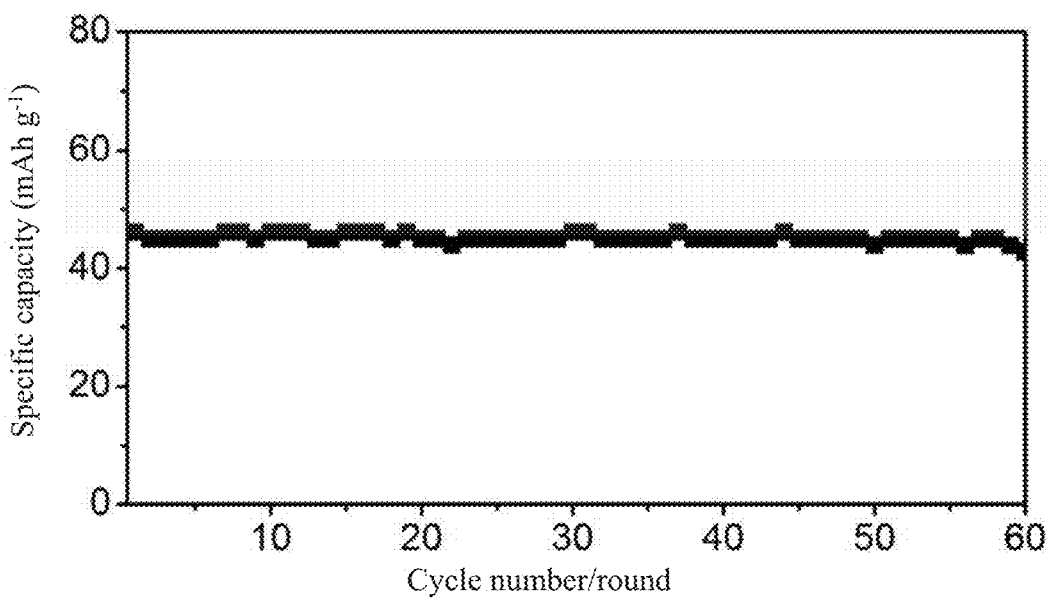
FIG. 21 shows a cycle performance of $ZnNb_8O_{21}$/$LiNi_{0.5}Mn_{1.5}O_4$ solid state battery produced in example 34 of the present invention measured at the current density of 10 C.

The cycle performance of the solid battery is tested. As shown in FIG. 21, ZnNb$_8$O$_{21}$/LiNi$_{0.5}$Mn$_{1.5}$O$_4$ solid battery can repeat 60 stable cycles at the current density of 10 C.

The above is only the example of the present disclosure, but not limit to the patent scope of the present disclosure, and equivalent structures or equivalent process transformations made by utilizing the present disclosure and the contents of the drawings, or directly or indirectly applied to other related technical fields, are all included in the scope of the patent protection of the present disclosure.

What is claimed is:

1. A non-aqueous electrolyte lithium-ion battery, comprising: a positive electrode material, non-aqueous electrolyte, and an anode material, a chemical formula of the anode material of the lithium-ion battery is M$_x$Nb$_y$O$_z$, M$_x$Nb$_y$O$_z$ is one or more compounds selected from Zn$_2$Nb$_{34}$O$_{87}$, Cu$_2$Nb$_{34}$O$_{87}$, Ca$_2$Nb$_{34}$O$_{87}$, CuNb$_8$O$_{21}$, ZnNb$_8$O$_{21}$, MgNb$_8$O$_{21}$, CaNb$_8$O$_{21}$, Cu$_{1/3}$Nb$_{74/3}$O$_{62}$, Zn$_{1/3}$Nb$_{74/3}$O$_{62}$, Mg$_{1/3}$Nb$_{74/3}$O$_{62}$, Ca$_{1/3}$Nb$_{74/3}$O$_{62}$, CuNb$_{20}$O$_{51}$, ZnNb$_{20}$O$_{51}$, MgNb$_{20}$O$_{51}$, CaNb$_{20}$O$_{51}$.

2. The non-aqueous electrolyte lithium-ion battery according to claim 1 comprising one or more type of a liquid state non-aqueous electrolyte lithium-ion battery, a gel state non-aqueous electrolyte lithium-ion battery, and a solid state non-aqueous electrolyte lithium-ion battery.

3. A method for manufacturing the solid state non-aqueous electrolyte lithium-ion battery according to claim 2 comprising the following steps:

mixing a solid state non-aqueous electrolyte into an organic solvent to obtain a gel liquid;

mixing a positive electrode material, an electric conductive agent, and the gel liquid uniformly to form a mixture, and then, coating the mixture onto a positive current collector, and then soliding to obtain a positive electrode plate;

mixing a negative electrode material, the electric conductive agent, and the gel liquid uniformly to form a mixture, and then, coating the mixture onto a negative current collector, and then soliding to obtain a negative solid material; balling the solid state non-aqueous electrolyte, and then mixing the balled solid state non-aqueous electrolyte into the organic solvent to obtain a slurry, coating the slurry on the negative solid material to form a separator on a surface of the negative solid material, and then soliding to obtain a negative electrode plate;

assembling the positive electrode plate and the negative electrode plate by laminating technology, to prepare the solid state non-aqueous electrolyte lithium-ion battery.

4. The method for manufacturing the solid state non-aqueous electrolyte lithium-ion battery according to claim 3, wherein, a soliding temperature for the positive electrode plate is ranged from 60° C. to 150° C., and the time is ranged from 2 h to 11 h;

the soliding temperature for the negative solid material and the negative electrode plate is ranged from 70° C. to 160° C., and the time is ranged from 70 s to 350 s.

5. The method for manufacturing the solid state non-aqueous electrolyte lithium-ion battery according to claim 3, wherein, the solid state non-aqueous electrolyte lithium-ion battery comprises:

65%-85% by mass weight of the positive electrode material, 2%~5% by mass weight of the electric conductive agent, 10%~33% by mass weight of the solid non-aqueous electrolyte, based on a total mass weight of the positive electrode plate;

65%~85% by mass weight of the negative electrode material, 2%~5% by mass weight of the electric conductive agent, 10%~33% by mass weight of the solid non-aqueous electrolyte, based on a total mass weight of the negative electrode plate.

6. The method for manufacturing the solid state non-aqueous electrolyte lithium-ion battery according to claim 3, wherein, the laminating technology is operated at room temperature, and a pressure applied onto laminating plates is ranged from 300 MPa to 600 MPa.

7. The method for manufacturing the solid state non-aqueous electrolyte lithium-ion battery according to claim 3, wherein, the solid state non-aqueous electrolyte comprises a sulfide based solid state electrolyte and/or an oxide-based solid state electrolyte;

the sulfide based solid state electrolyte comprising $Li_2S$-A, halogen doped $Li_2S$-A, halogen doped $Li_2S$-$MeS_2$-$P_2S_5$ or halogen doped $Li_2S$-$MeS_2$-$P_2S_5$, wherein, A is one or more compounds selected from $P_2S_5$, $SiS_2$, $GeS_2$, $B_2S_3$ and $Al_2S_4$, Me is one or more elements selected from Si, Ge, Sn and Al, halogen is one or more element selected from Cl, Br and I.

* * * * *